(12) United States Patent
Savage et al.

(10) Patent No.: US 7,377,211 B1
(45) Date of Patent: May 27, 2008

(54) NUT-CRACKING APPARATUS

(75) Inventors: Basil W. Savage, Madill, OK (US);
Steven W. Savage, Madill, OK (US);
Randal D. Ingle, Mannsville, OK (US)

(73) Assignee: Savage Equipment Incorporated, Madill, OK (US)

( * ) Notice: Subject to any disclaimer, the term of this patent is extended or adjusted under 35 U.S.C. 154(b) by 773 days.

(21) Appl. No.: 10/718,378

(22) Filed: Nov. 19, 2003

(51) Int. Cl.
*A23N 5/00* (2006.01)
(52) U.S. Cl. .............................. 99/571; 99/574; 99/581
(58) Field of Classification Search .................. 99/571, 99/574, 577, 578, 581
See application file for complete search history.

(56) References Cited

U.S. PATENT DOCUMENTS

| | | | |
|---|---|---|---|
| 2,083,968 A * | 6/1937 | Walling | 99/573 |
| 3,561,513 A * | 2/1971 | Lindsey | 99/571 |
| 3,871,275 A | 3/1975 | Quantz | |
| 4,332,827 A | 6/1982 | Quantz | |
| 4,418,617 A | 12/1983 | Quantz | |
| 4,441,414 A | 4/1984 | Quantz | |
| 5,623,867 A | 4/1997 | Quantz | |
| 6,182,562 B1 | 2/2001 | Quantz et al. | |
| 6,205,915 B1 | 3/2001 | Quantz | |
| D442,189 S | 5/2001 | Quantz et al. | |
| D442,609 S | 5/2001 | Quantz et al. | |
| 6,270,824 B1 | 8/2001 | Quantz | |
| 6,584,890 B1 | 7/2003 | Quantz et al. | |
| 6,588,328 B1 | 7/2003 | Quantz et al. | |

* cited by examiner

*Primary Examiner*—Reginald L. Alexander
(74) *Attorney, Agent, or Firm*—McAfee & Taft

(57) ABSTRACT

A nut-cracking apparatus has an endless conveyor that delivers nuts from a hopper to a pickup point. A rotating turret is mounted to a frame and includes a plurality of nut-cracking units. The nut-cracking units engage nuts carried by the endless conveyor at the pickup point and remove nuts therefrom. The forward sprocket about which the endless conveyor rotates has an axis of rotation that is offset from the axis of rotation of the turret. The axis of rotation of the forward conveyor sprocket falls within a circular periphery defined by the nut-cracking units on the rotating turret.

35 Claims, 21 Drawing Sheets

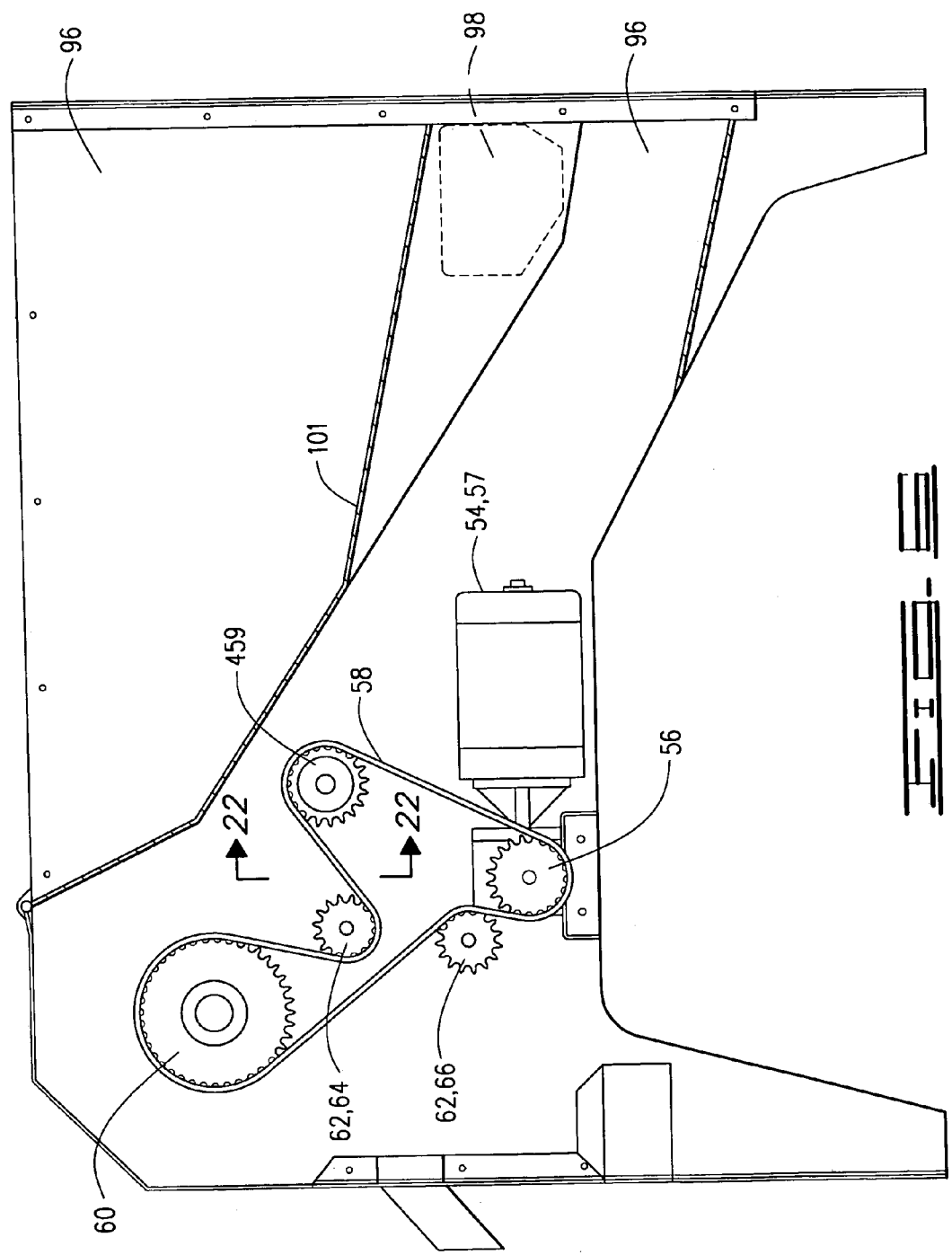

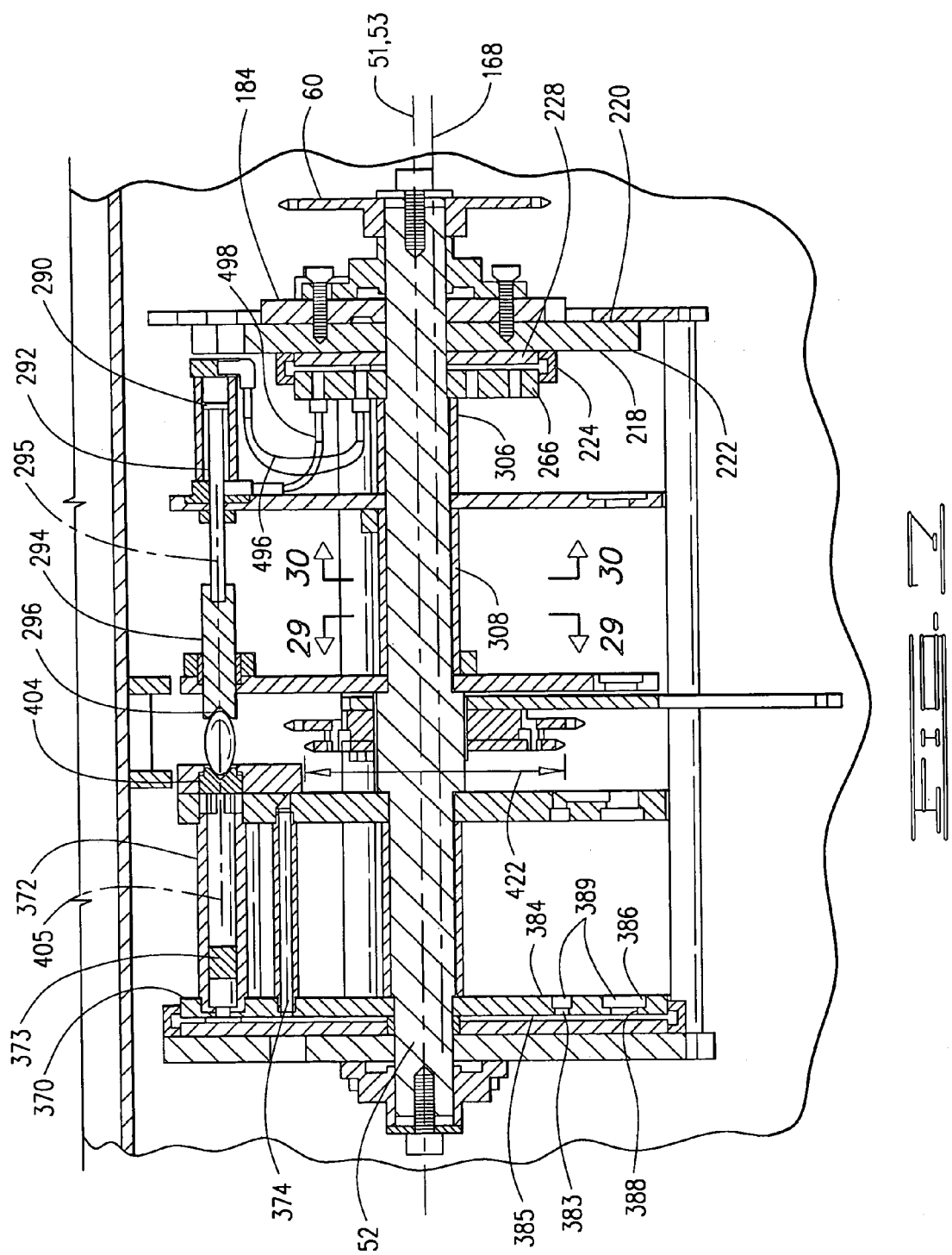

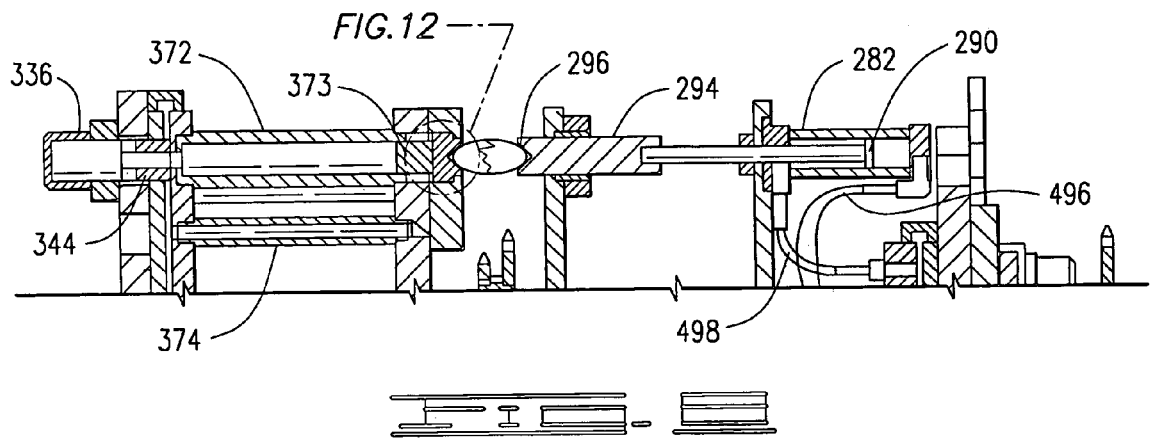
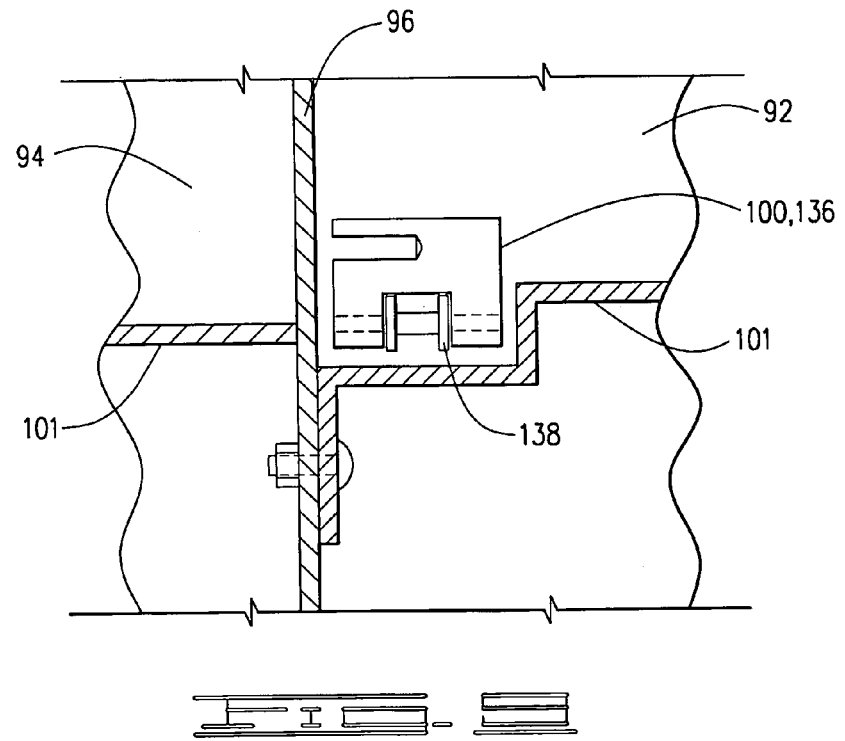

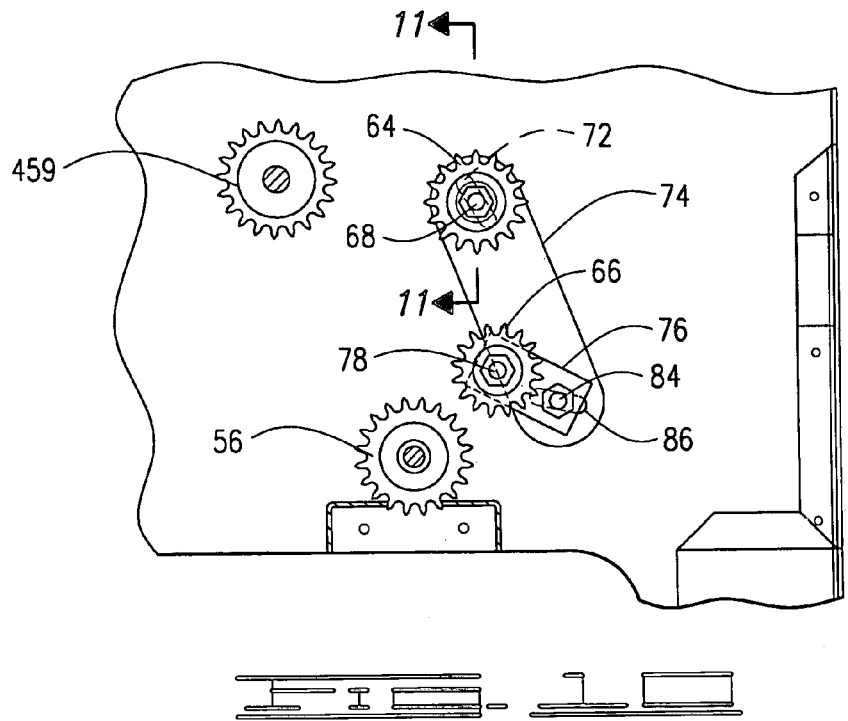
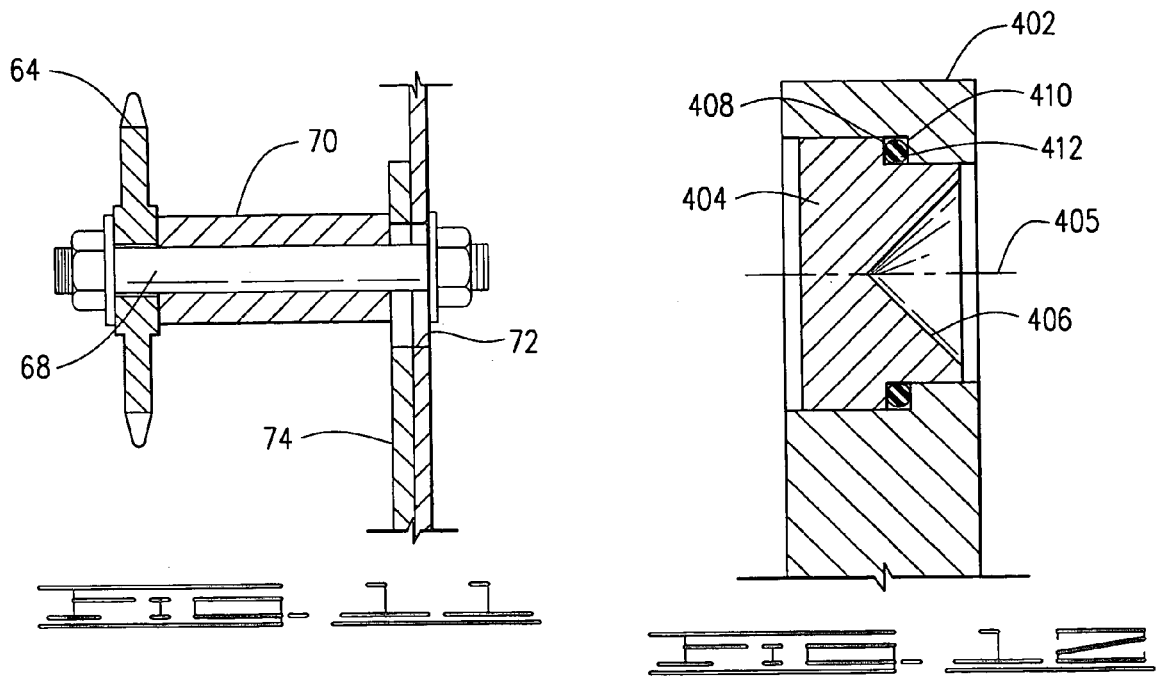

NUT-CRACKING APPARATUS

FIELD OF THE INVENTION

The present invention relates to an apparatus for cracking nuts at high production rates, and more specifically to a nutcracker for cracking nuts at high production rates that is compact and that efficiently delivers cracked nuts and shell fragments to a single receptacle.

There are a number of prior U.S. patents that disclose nut-cracking apparatus including U.S. Pat. Nos. 6,588,328, 6,584,890, 6,270,824, 6,205,915, 6,182,562, 5,623,867, 4,441,414, 4,418,617, 4,332,827. Each of the aforementioned patents discloses an endless feed conveyor that delivers nuts from a hopper or bin to a rotating turret. The rotating turret includes nut-cracking units that engage the nuts to be cracked at a pickup point to remove the nuts from the endless conveyor. The feed conveyor generally includes a feed chain disposed about a plurality of sprockets. A plurality of nut-carrying, or nut-transporting units connected to the feed chain deliver the nuts to be cracked from the hopper to the pickup point. Methods and apparatus disclosed in the aforementioned patents include pneumatic systems associated with the nut-cracking units. The nut-cracking units crack the nuts, and in many of the devices loose shell fragments are drawn off by a vacuum line and the cracked nut is delivered to a separate discharge chute. Although there are a number of prior art nut-cracking apparatus, there is still a need for improved methods and apparatus for high production nut-cracking that is more compact, and that effectively confines both the cracked nuts and shell fragments for delivery into a single outlet and then to a single receptacle. In addition there is a continuing need for nut-cracking apparatus that has a more efficient pneumatic system for holding and cracking nuts.

SUMMARY OF THE INVENTION

The nut-cracking apparatus of the current invention has a bin or hopper for holding nuts, for example pecans. The invention includes an endless conveyor mounted about a plurality of sprockets and preferably mounted around a rear and a forward sprocket. The endless conveyor comprises a plurality of nut-transporting units connected to and carried by a feed chain. The endless conveyor moves about the sprockets and moves nuts from the hopper to a pickup point.

A turret comprising a plurality of nut-cracking units is rotatably mounted to a frame. Preferably, the turret and the sprockets for the endless conveyor are driven by a single motor. The frame of the nut-cracking apparatus has a door pivotally attached thereto which is movable between an open position and a closed position which covers the rotatable turret. Each nut-cracking unit will engage a nut positioned on the endless conveyor at the pickup point. The sprockets about which the endless conveyor is mounted rotate in the same direction as the turret. The center of rotation of the forward sprocket for the endless conveyor is offset from a center of rotation of the turret and is within a peripheral area defined by the nut-cracking units. The nut-cracking apparatus of the current invention thus provides a more compact apparatus than prior art nut-cracking apparatus.

Each nut-cracking unit is adapted to engage a nut carried in a nut-transporting unit and to remove the nut therefrom at the pickup point. The nut-cracking units comprise a nut-clamping rod and a crack die. The nut-clamping rod is attached to a piston that is movable in a nut-clamping cylinder. A pneumatic system associated with the nut-cracking unit supplies air to the nut-clamping cylinder associated with the piston and will move the piston toward a crack die that is axially aligned with the nut-clamping rod. After a nut is initially engaged, additional air is supplied to the cylinder to increase the stress or pressure applied to the nut as the turret rotates. The pneumatic system then applies air to a shuttle cylinder operably associated with the crack die. The air applied causes a shuttle within the shuttle cylinder to move forward to engage the crack die which causes the nut held by the nut-cracking unit to be cracked. Air is then applied to the nut-clamping cylinder to cause the piston to move the nut-clamping rod away from the crack die thus releasing the nut, which is directed to an outlet in the frame.

The nut-cracking apparatus has a crack containment area which limits the spray of shell fragments and which directs all, or substantially all, of the shell fragments into the same outlet as the cracked nut so that shell fragments and cracked nuts can be delivered into a single receptacle. The crack containment area comprises a pair of opposed ribs mounted to the frame door. The opposed ribs have an arcuate shape and may be spaced apart such that the nuts are cracked between vertical planes defined by the opposed ribs.

BRIEF DESCRIPTION OF THE DRAWINGS

FIG. 6 is a view looking from the right showing the arrangement of the drive chain and sprockets.

FIG. 7 is a section view showing a nut-cracking unit after a nut has been engaged.

FIG. 8 is a cross-section showing a nut-cracking unit in a clamped, cracking position.

FIG. 9 is a view from line 9-9 of FIG. 3.

FIG. 10 is a view from the left showing the sprocket arrangement.

FIG. 11 is a view from line 11-11 of FIG. 10.

FIG. 12 is a view from FIG. 8 showing a cross-section of a crack die.

DETAILED DESCRIPTION OF THE PREFERRED EMBODIMENTS

Figure 1:
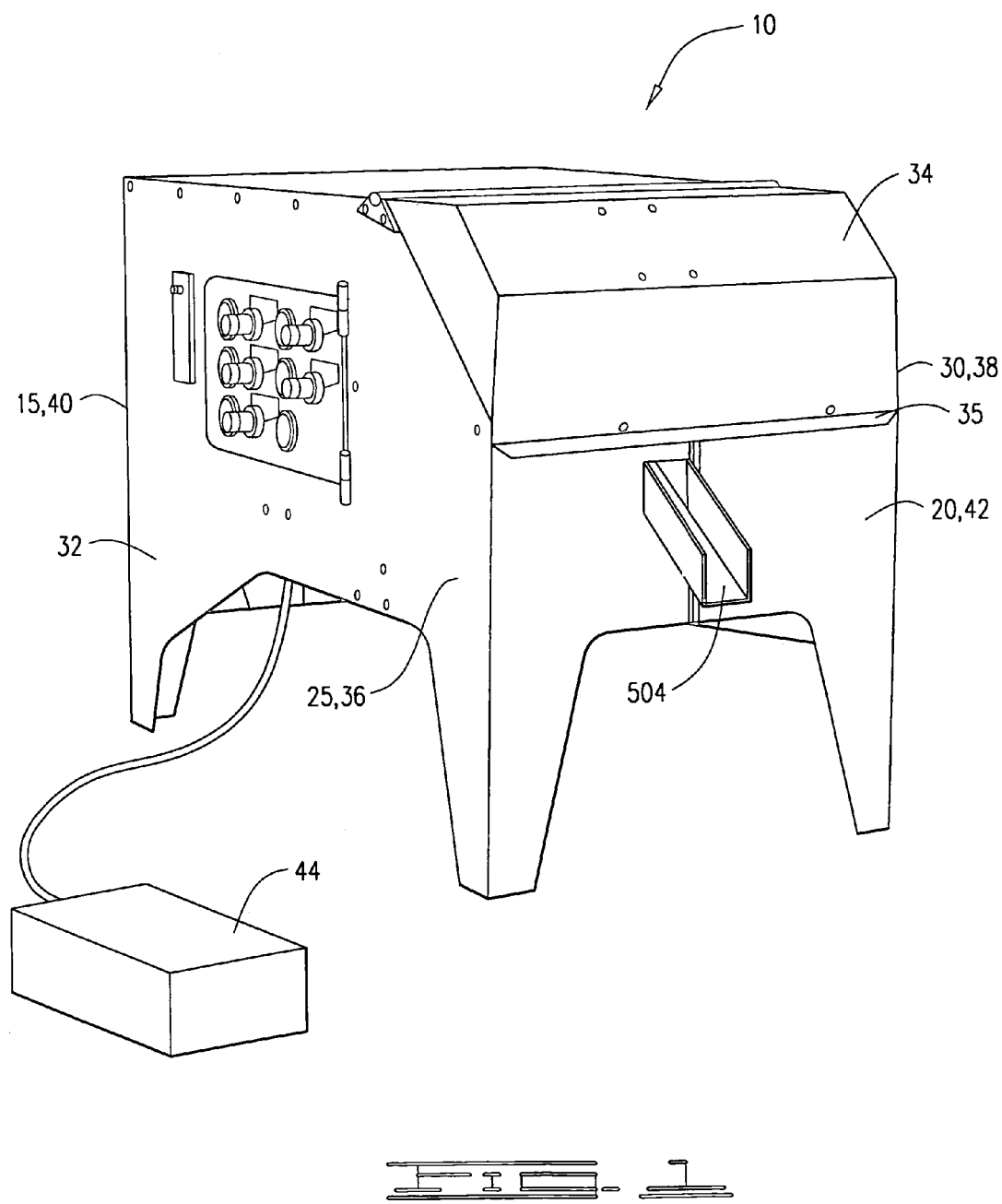
FIG. 1 is a perspective view of the nut-cracking apparatus of the current invention.
Figure 2:
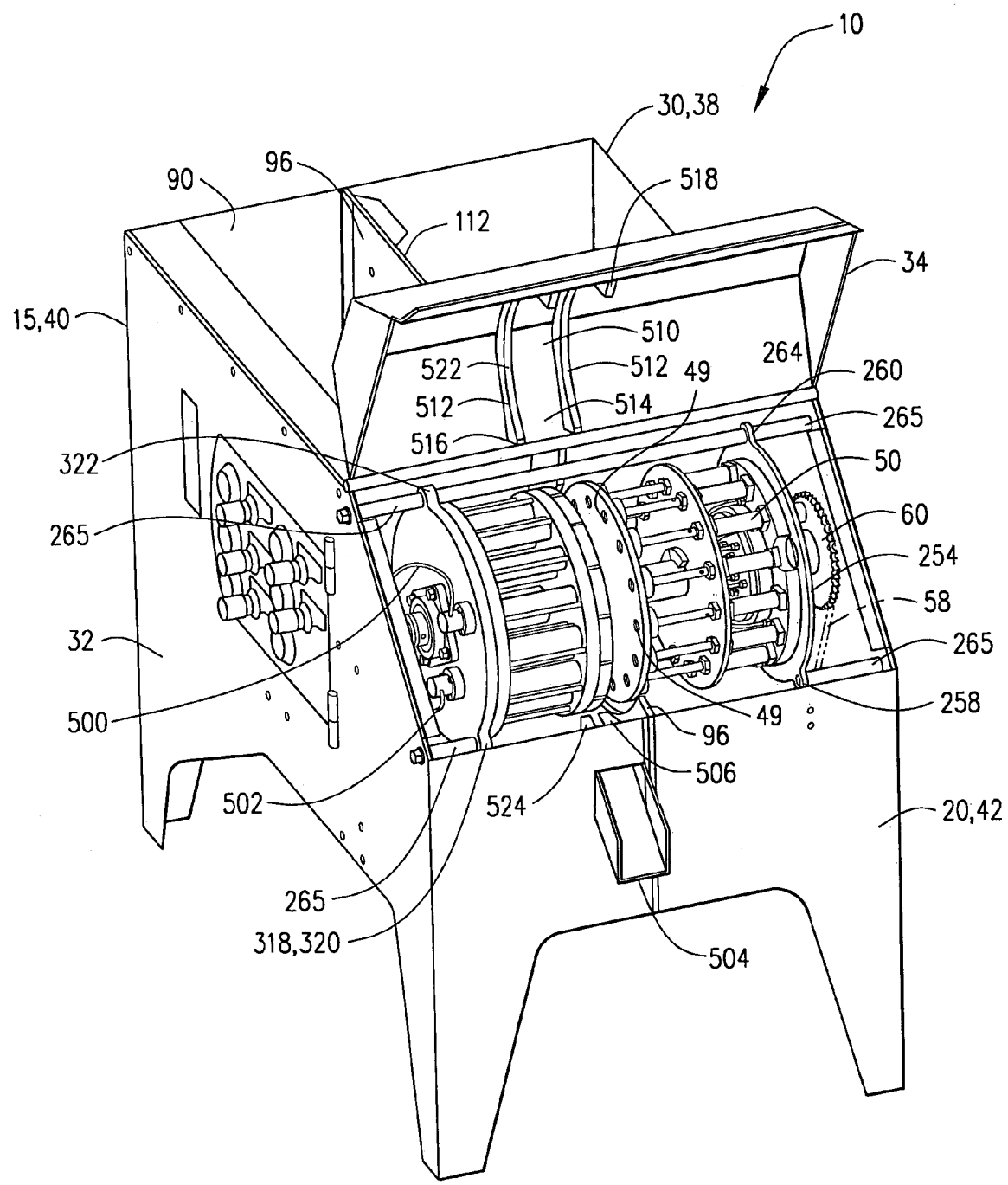
FIG. 2 is a perspective view of the apparatus with the lid open showing the turret.

Referring to the drawings and more specifically to FIG. 1, a nut-cracking apparatus 10 embodying the features of the current invention is illustrated. Nut-cracking apparatus 10 has a rear 15, a forward end 20, a first or left side 25 and a second or right side 30. Nut-cracking apparatus 10 comprises a frame 32 with a door 34 pivotably attached thereto and movable between an open position as shown in FIG. 2 and a closed position as shown in FIG. 1. Door 34 is hinged to frame 32 at its rear, upper edge 33, and has a forward, lower edge 35. Frame 32 has a left, or first side 36, a right, or second side 38, a rear end 40 and a forward end 42. Apparatus 10 has an air compressor 44, or other air source associated therewith.

A turret 50, including a plurality of circumferentially or peripherally spaced nut-cracking units 49, is rotatably mounted in frame 32. Turret 50 has a longitudinal central axis, or axis of rotation 51. Turret 50 is rotatably mounted on a shaft 52 that is driven by a motor 54, which is schematically represented in FIG. 6. Shaft 52 has a longitudinal central axis, or axis of rotation 53, that is coaxial with axis 51.

Motor 54 has a drive sprocket 56 connected thereto. A chain 58 engages sprocket 56 and also engages a shaft sprocket 60 mounted to shaft 52. A drive system 57 for turret 50, better seen in FIG. 6, includes the motor 54, drive sprocket 56, chain 58 and shaft sprocket 60. A plurality of other sprockets, and in the embodiment shown two idler sprockets 62 may be included. Idler sprockets 62 comprise an upper idler sprocket 64 and a lower idler sprocket 66. Upper and lower idler sprockets 64 and 66 are rotatably mounted to frame 32 and more specifically are rotatably mounted to right side 38 of frame 32. Upper and lower sprockets 64 and 66 are spaced inwardly from right side 38 and are aligned with motor sprocket, or drive sprocket 56 and shaft sprocket 60. Upper and lower idler sprockets 64 and 66 are movable relative to frame 38. As shown in FIG. 11, upper sprocket 64 may be rotatably mounted with a pin 68 or other element for rotation as may be known in the art. A spacer 70 may be disposed about pin 68 to space sprocket 64 from right side 38. Right side 38 may have a slot 72 therein to allow sprocket 64 to be moved relative to right side 38. A strap or other rigid member 74 may be attached to frame 32 by welding or other means known in the art. A mounting box 76 may be used to space idler sprocket 66 from right side 38. Mounting box 76 is generally rectangular and will space sprocket 66 inwardly the same distance from right side 38 as sprocket 64. Mounting box 76 has openings therein through which a pin 78 can be inserted. Pin 78 will extend through right side 38 and idler sprocket 76 may be rotatably mounted to pin 78. A bolt 84 or other fastening means known in the art may be utilized to mount box 76 to frame 32. Bolt 84 may extend through a slot 86 in right side 38 of frame 32. Slots 72 and 86 will likewise be defined in strap 74.

Figure 3:
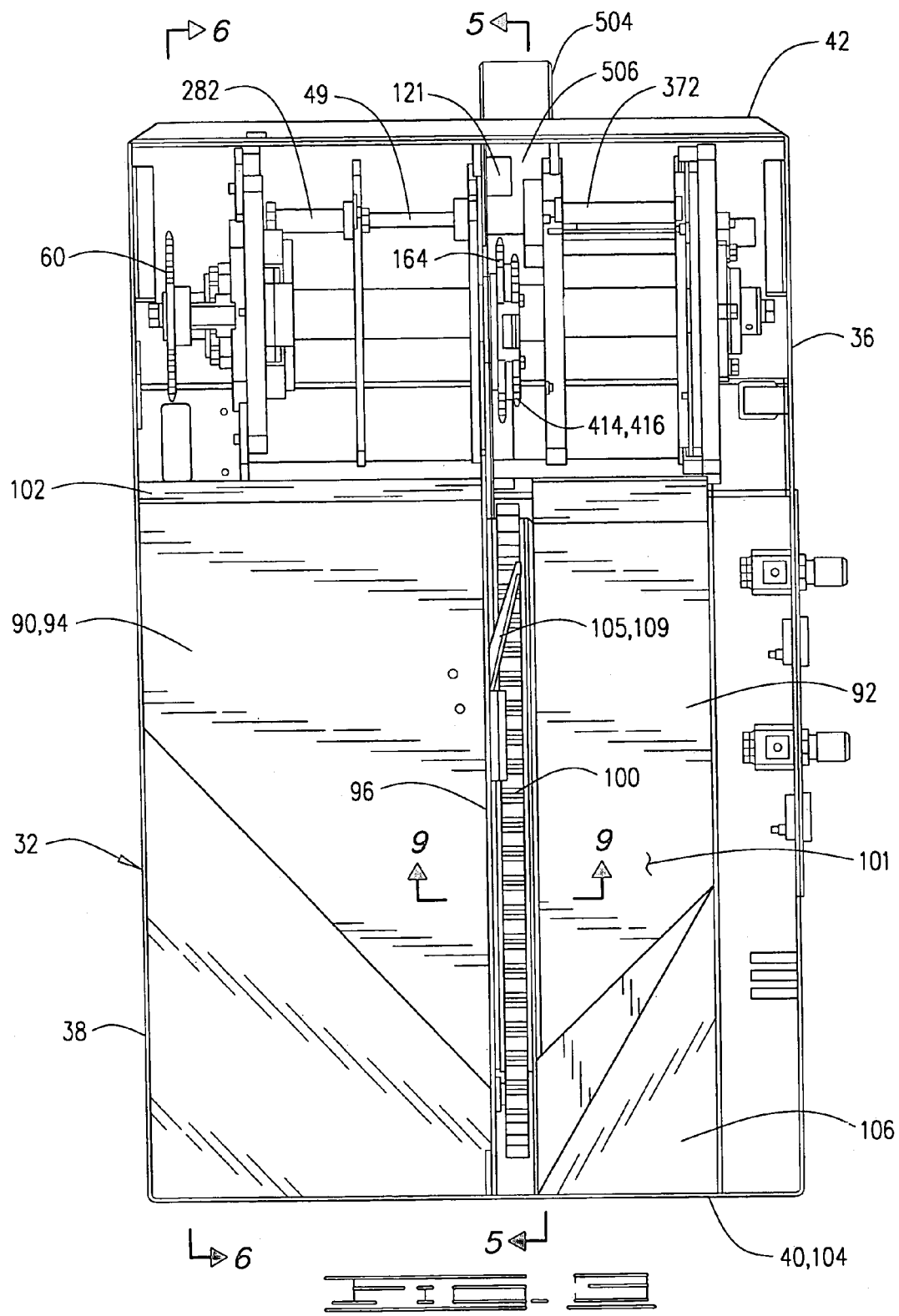
FIG. 3 is a view looking down into the hopper of the nut-cracking apparatus of the current invention.
Figure 4:
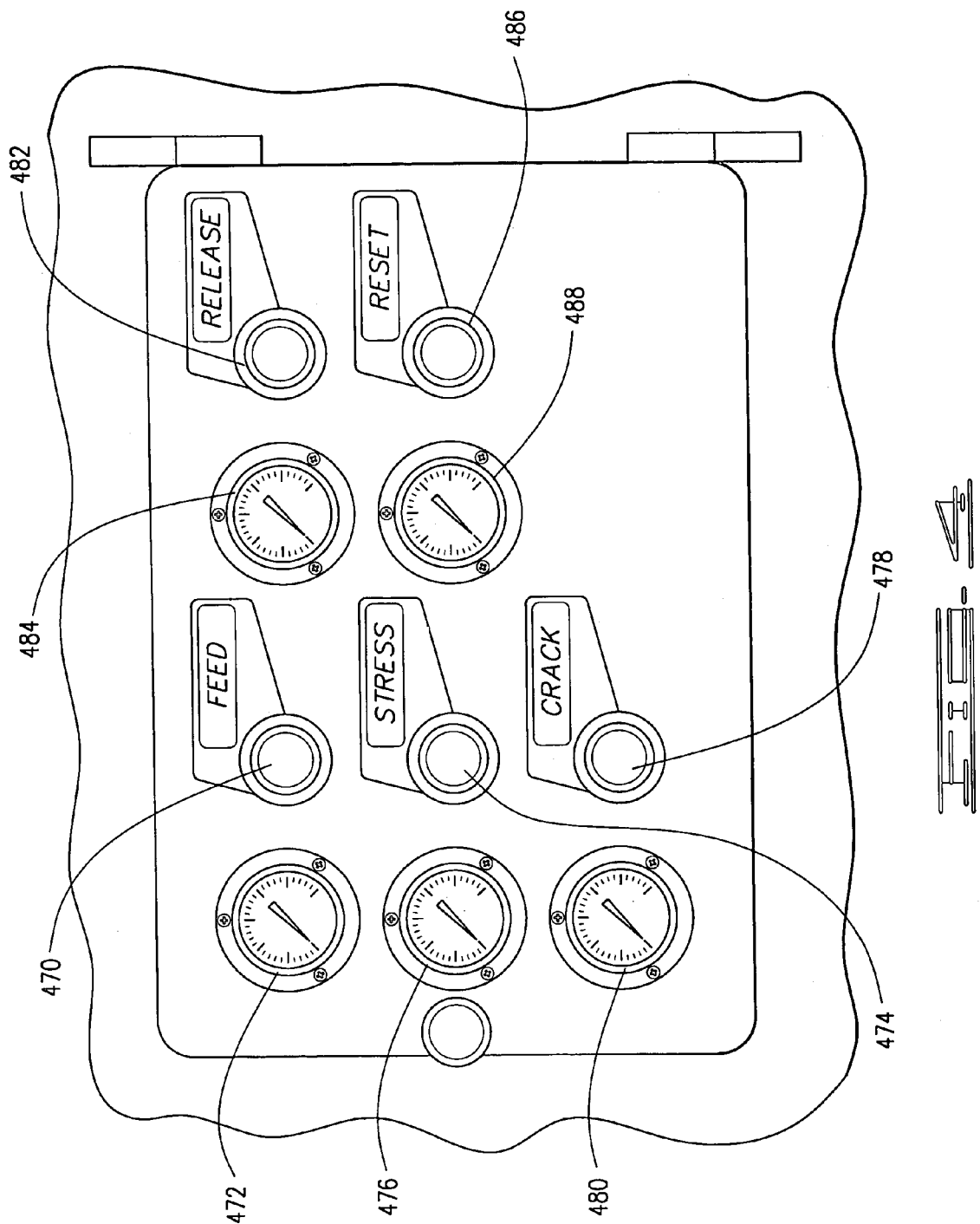
FIG. 4 is a left-side view showing the control panel.

Referring now to FIG. 3, frame 32 defines a hopper, or hopper portion 90 for holding nuts to be delivered to turret 50. Hopper 90 is divided into a first or left side portion 92 and a right or second side portion 94 by a divider plate 96.

Figure 5:
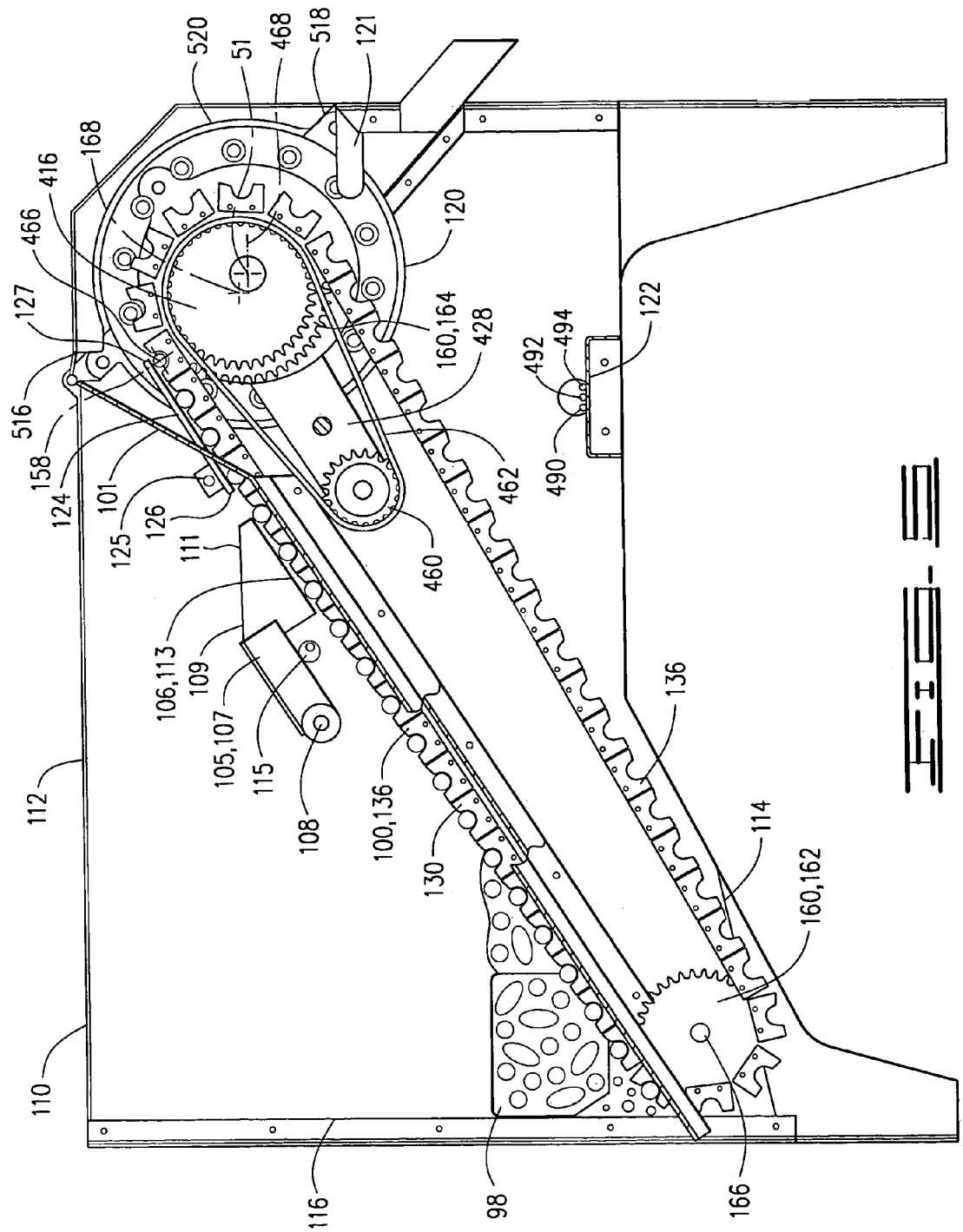
FIG. 5 is a view from line 5-5 of FIG. 3, showing the arrangement of the nut chain, and the sprockets about which the nut chain is mounted.
Figure 13:
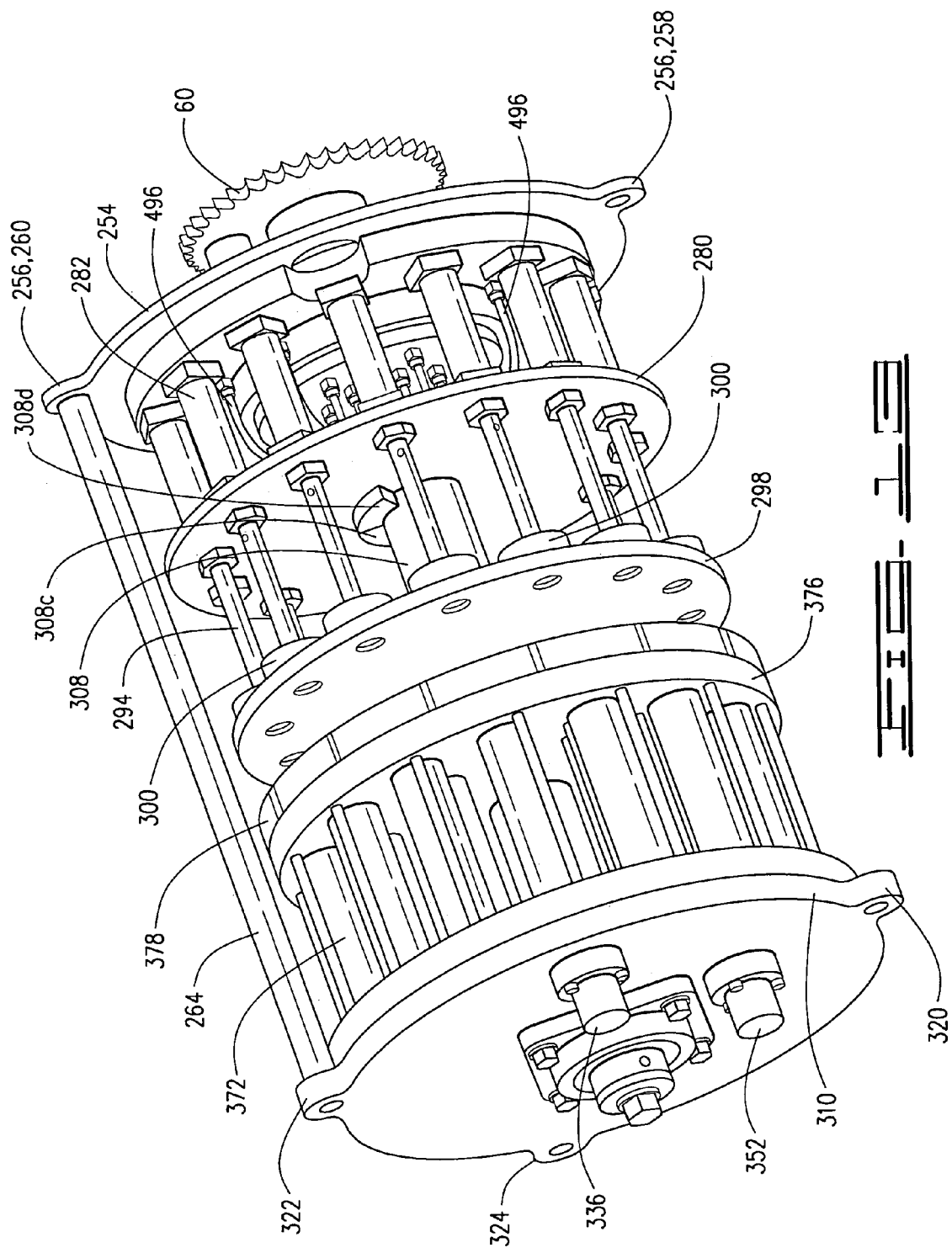
FIG. 13 is a perspective view of the turret of the nut-cracking apparatus.

Nuts, for example pecans, are placed in right side portion 94 where they pass through an opening 98, better seen in FIG. 5. Nuts passing through opening 98 are picked up by an endless conveyor 100 that moves the nuts upwardly towards turret 50. FIG. 3 shows only a portion of the endless conveyor, and a number of details of turret 50 are omitted to provide for ease of discussion. Only one nut-cracking unit 49 is shown in FIG. 3. Hopper 90 has a bottom 101 which slopes downwardly from a forward end 102 thereof towards rear end 104 and opening 98. Left side portion 92 slopes downwardly from the forward end 102 of hopper 90 and has a sloping portion 106 at the rear end of hopper 90 that slopes toward endless conveyor 100, so that any nuts that fall out of endless conveyor 100 will be directed back into endless conveyor 100 by the slope of the hopper. Nuts carried by endless conveyor 100 will pass under a deflector plate 105 which has a lower edge 106. Deflector plate 105 comprises a plate, or mounting portion 107 that is pivotally attached to divider 96 with a pin 108 or by other means known in the art. A deflector portion 109 extends from mounting portion 107, and angles away from divider 96, and is also inclined from an upper edge 111 to a lower edge 113 thereof. The height of deflector portion 109 relative to the endless conveyor 100 is adjustable. A cam 115 is eccentrically attached to divider plate 96, and deflector plate 105 rests thereon. The height of deflector portion 109 can be adjusted by rotating cam 115 about a pin to which the circular cam is eccentrically mounted.

As shown in FIG. 5, divider plate 96 extends from at or near a top 110 of the frame downwardly beneath the bottom 101 of hopper 90. Divider plate 96 has upper edge 112 and lower edge 114. Divider plate 96 likewise has rear edge 116 and extends therefrom to forward edge 118. A portion of forward edge 118 comprises a curvilinear edge 120, at least a portion of which will generally match the shape of turret 50. A bumper 121, which may be a rubber bumper 121, may be mounted to divider plate 96 at the forward end thereof. A mounting bracket 122 extends from left side 36 to right side 38 of frame 32 and may be utilized to mount motor 54. Mounting bracket 122 may be connected to divider plate 96 at lower edge 114 thereof. An orienting plate 124 which is a generally flat plate overlies a portion of endless conveyor 100 and is generally parallel to endless conveyor 100. Orienting plate 124 is attached to divider plate 114 with a bracket 125 and extends from a rear end 126 to a forward end 127 thereof.

Figure 26:
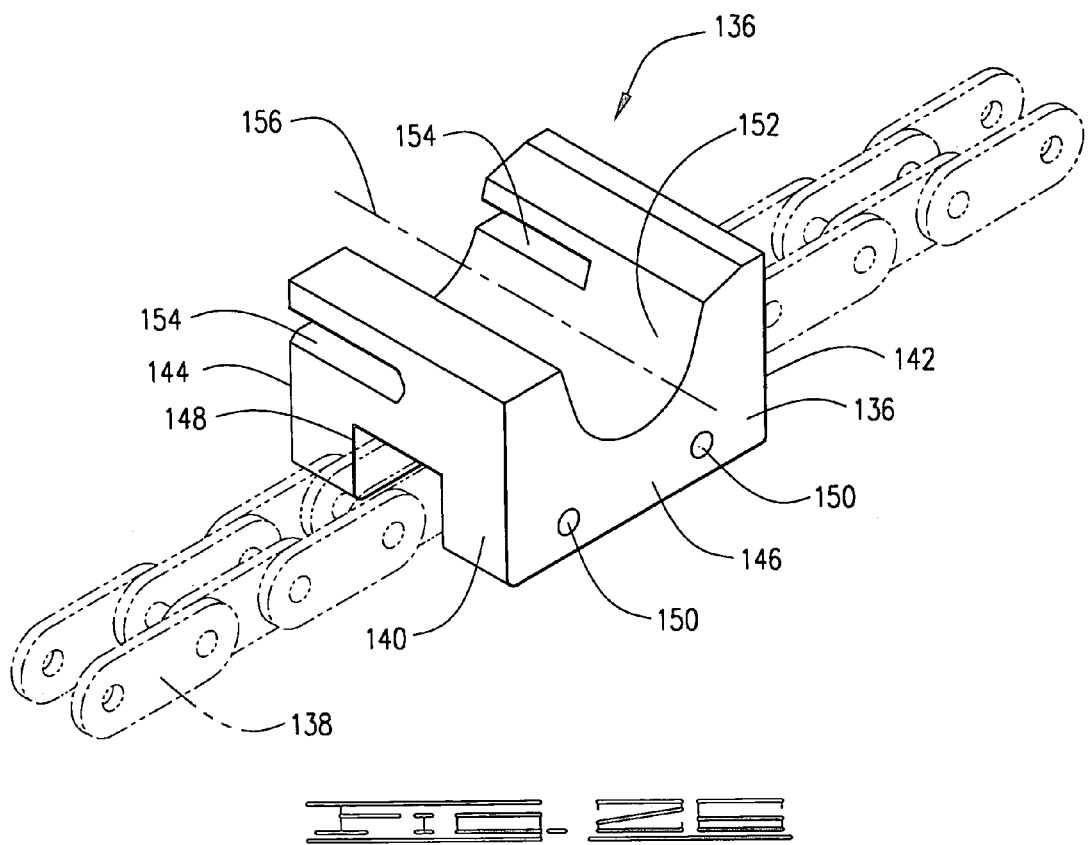
FIGS. 26-28 are views of a nut-transporting unit of the current invention.
Figures 27, 28:
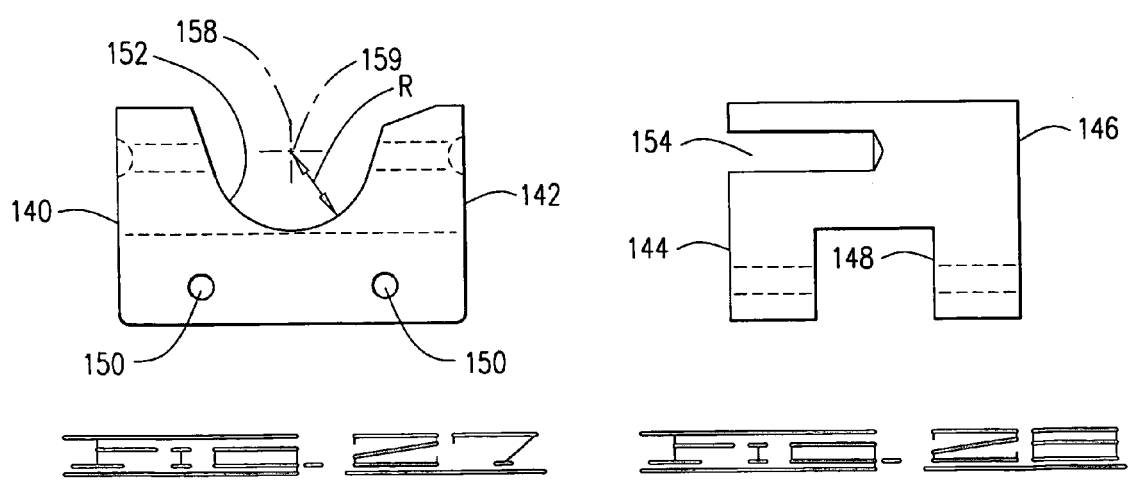
Figure 29:
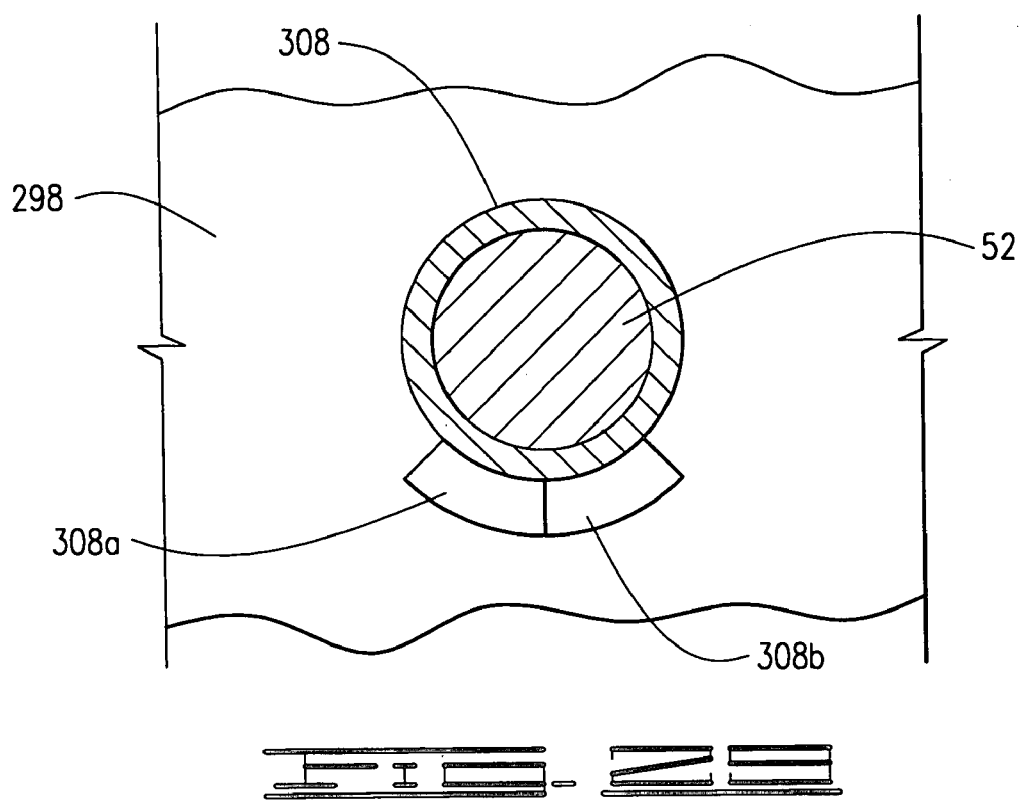
FIG. 29 is a view from line 29-29 of FIG. 7.
Figure 30:
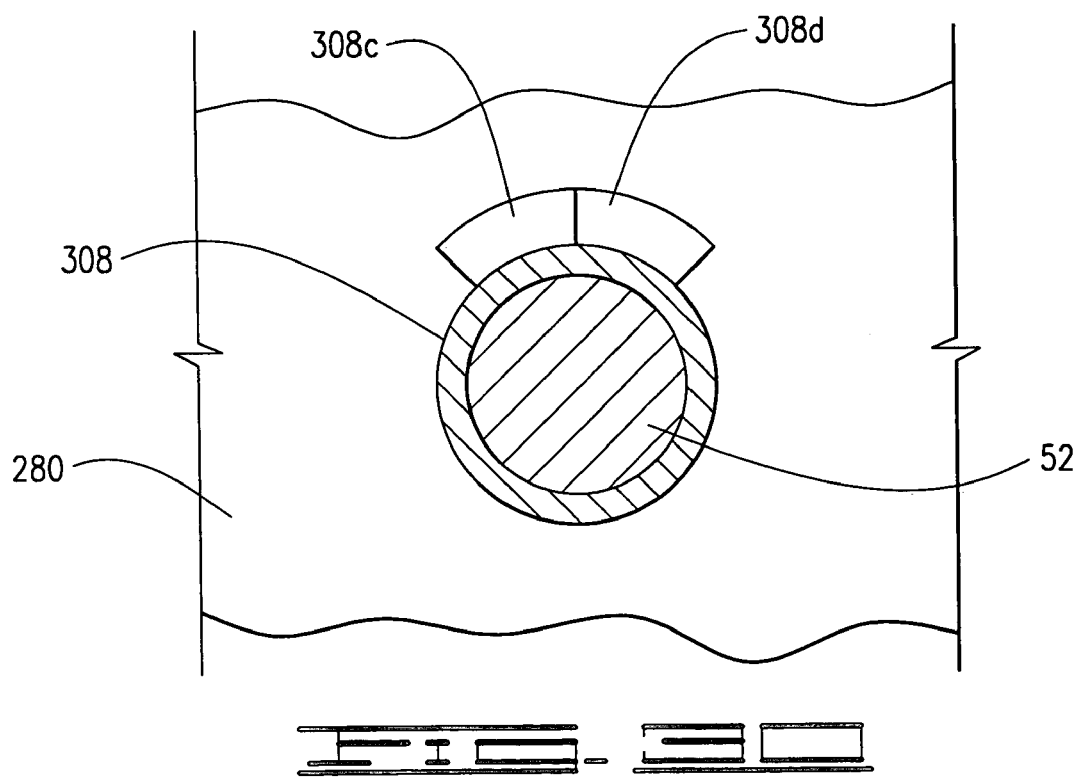
FIG. 30 is a view from line 30-30 of FIG. 7.

Endless conveyor 100 has an upper run 130, or upwardly inclined portion 130, that slopes or is inclined upwardly from or near rear end 104 of hopper 90 toward forward end 102 thereof. Endless conveyor 100 comprises a plurality of nut pockets, or nut-transporting units 136 mounted to a feed chain 138. Nut pockets 136 are mounted in succession on feed chain 138 and will deliver nuts from hopper 90 to turret 50. Nut pockets 136, which may be referred to as nut-carrying, or nut-transporting units 136, are shown in more detail in FIGS. 26-28. Each nut pocket 136 has first and second ends 140 and 142, respectively, and first, or left and second, or right sides 144 and 146, respectively. A notch 148 in the lower end is adapted to receive feed chain 138 which is attached thereto with pins extending through holes 150 defined through nut pocket 136. Each nut pocket 136 has a generally semi-cylindrical receptacle 152 that extends from first side 144 to second side 146. A pair of slots 154 extend from the first side 144 of the nut pocket a portion of the distance to the second side 146 thereof. Slots 154 are utilized in a manner known to help insure that only one nut is carried by each nut-transporting unit 136. Semi-cylindrical receptacle 152 has a central axis 156, which intersects a vertical center line 158 in FIG. 27 at a point 159. As is apparent from the figures, point 159 would be the center of a circle drawn with a radius R which defines semi-cylindrical receptacle 152.

Endless conveyor 100 is mounted to frame 38 on a plurality of sprockets 160 and more specifically on a first or rear conveyor sprocket 162 and a second or forward conveyor sprocket 164. Rear sprocket 162 is an idler sprocket that is mounted to divider plate 96 for rotation with a pin 166 or other means known in the art. Forward sprocket 164 is mounted to shaft 52. Forward sprocket 164 has a center, or axis of rotation 168 about which sprocket 164 rotates. Axis of rotation 168 is offset from axis of rotation 51 of turret 50. FIG. 3 cuts the endless conveyor 100 off and does not show the engagement of endless conveyor 100 with sprocket 164.

Figure 14:
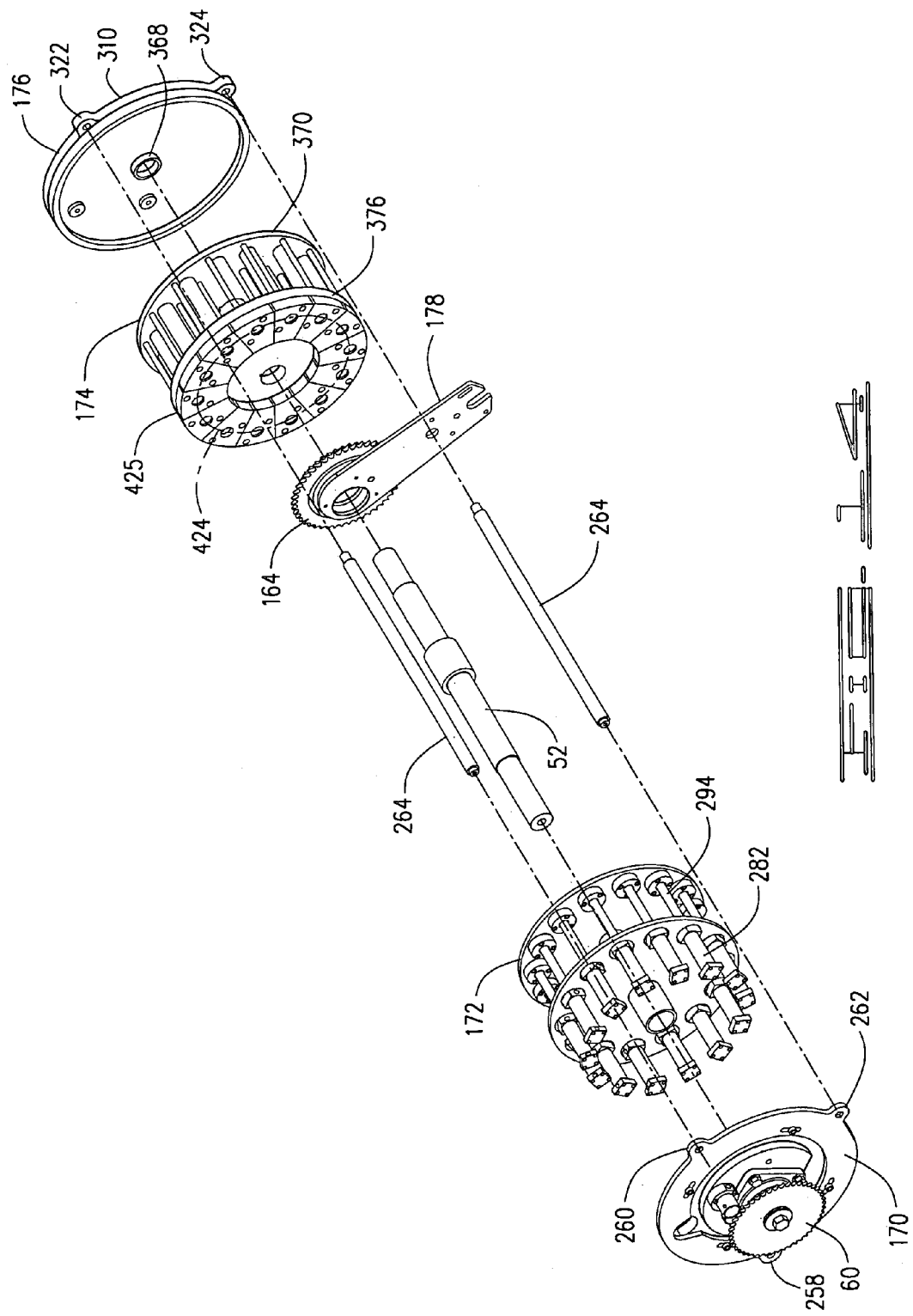
FIG. 14 is an exploded view of the turret assembly.

A portion of turret assembly 50 is shown in cross section in FIG. 7, and turret assembly 50 is also shown in exploded views for ease of discussion. As shown in FIG. 14, turret 50 includes a right valve plate assembly 170, a cylinder plate assembly 172, a crack die and shuttle assembly 174 and a left valve plate assembly 176. A pocket chain drive assembly 178 is mounted on shaft 52 between cylinder plate assembly 172 and crack die and shuttle assembly 174. Forward sprocket 164, also referred to as nut chain sprocket 164 comprises a part of pocket chain drive assembly 178. Shaft sprocket 60 is attached to shaft 52 with a fastener or other means known in the art that is threaded into an end of shaft 52. Shaft 52 is mounted for rotation with and by sprocket 60. Sprocket 60 is thus keyed or otherwise connected to shaft 52 so that rotation of sprocket 60 will cause shaft 52 to rotate.

Figure 15:
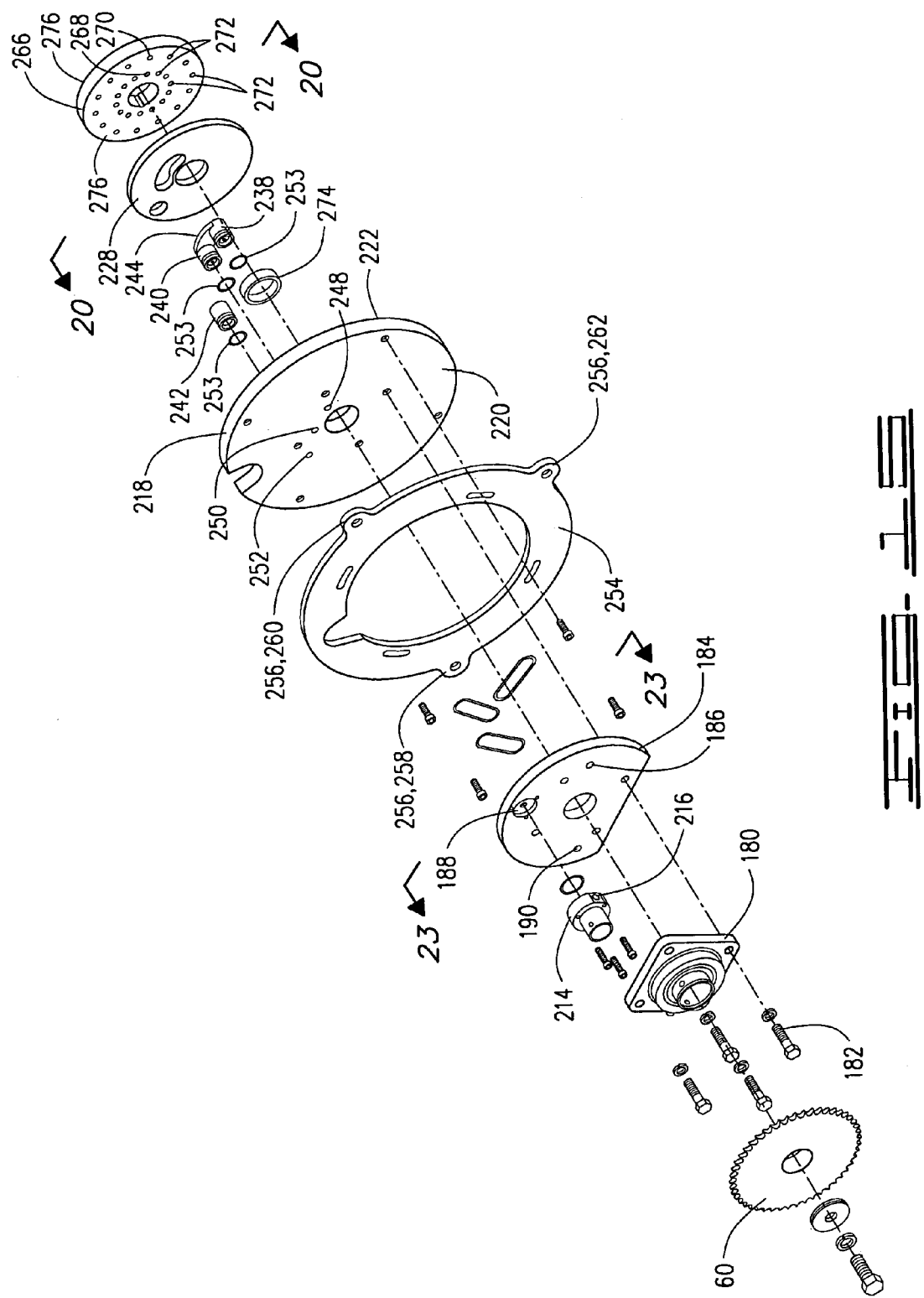
FIG. 15 is an exploded view of the right valve plate assembly of the current invention.
Figure 23:
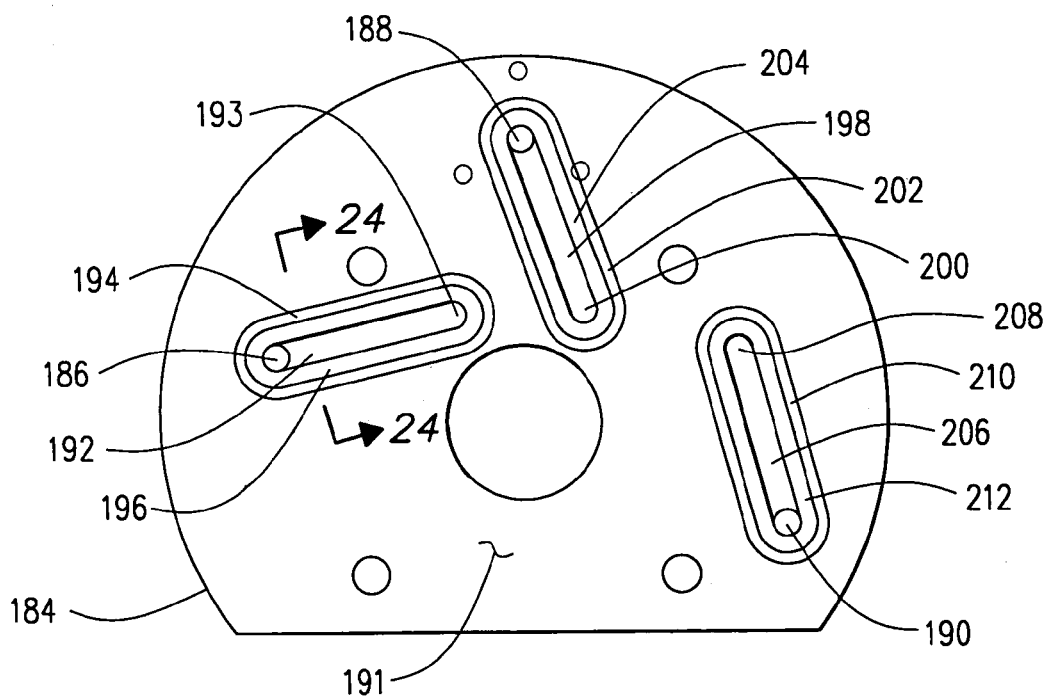
FIG. 23 is a view from line 23-23 of FIG. 15.
Figure 24:
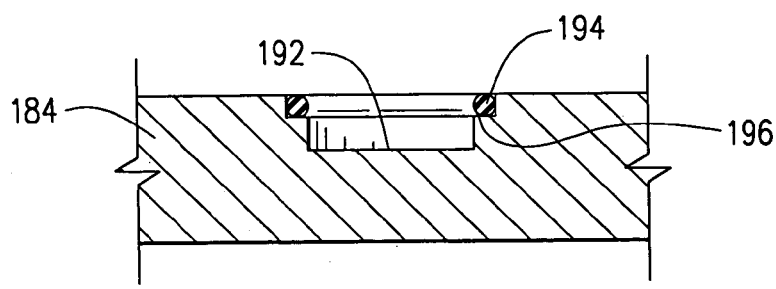
FIG. 24 is a section view from line 24-24 of FIG. 23.
Figure 25:
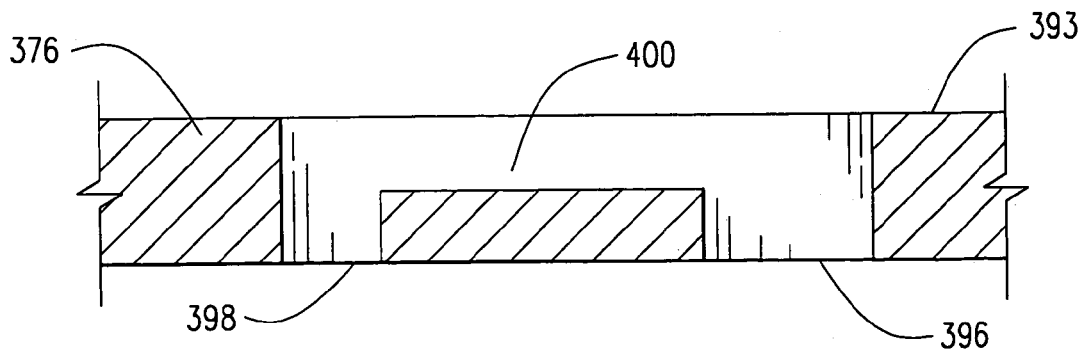
FIG. 25 is a view from line 25-25 of FIG. 18.

Referring to FIG. 15, right valve plate assembly 170 includes a flanged bearing 180 for supporting shaft 52. Flanged bearing 180 is attached with fasteners 182 or other means known in the art to a right bearing mount plate 184. Right bearing mount plate 184 has first, second and third openings 186, 188 and 190, respectively, which are threaded or otherwise adapted to receive fittings to allow air to pass therethrough. Air can be provided from air compressor 44 or other air source as is known in the art. First, second and third openings 186, 188 and 190 may be referred to herein as feed air opening 186, stress air opening 188 and release air opening 190. FIG. 23 shows the left, or inner side 191 of right bearing mount plate 184. Feed opening 186 is communicated with a groove 192 defined in right bearing mount plate 184. Groove 192 has a terminating end 193. An O-ring or other sealing element 194 is placed in a shoulder 196 defined in right bearing mount plate 184. Similarly, stress opening 188 is communicated with a groove 198 having an end 200. O-ring or other sealing element 202 is placed in a shoulder 204 that circumscribes groove 198. A groove 206 is communicated with release air opening 190 and has an end 208. An O-ring or other sealing element 210 is placed in shoulder 212 which circumscribes groove 206. An accumulator 214 with an opening 216 therein for receiving air may be connected to right bearing mount plate 184 to communicate air into stress opening 188.

Figure 20:
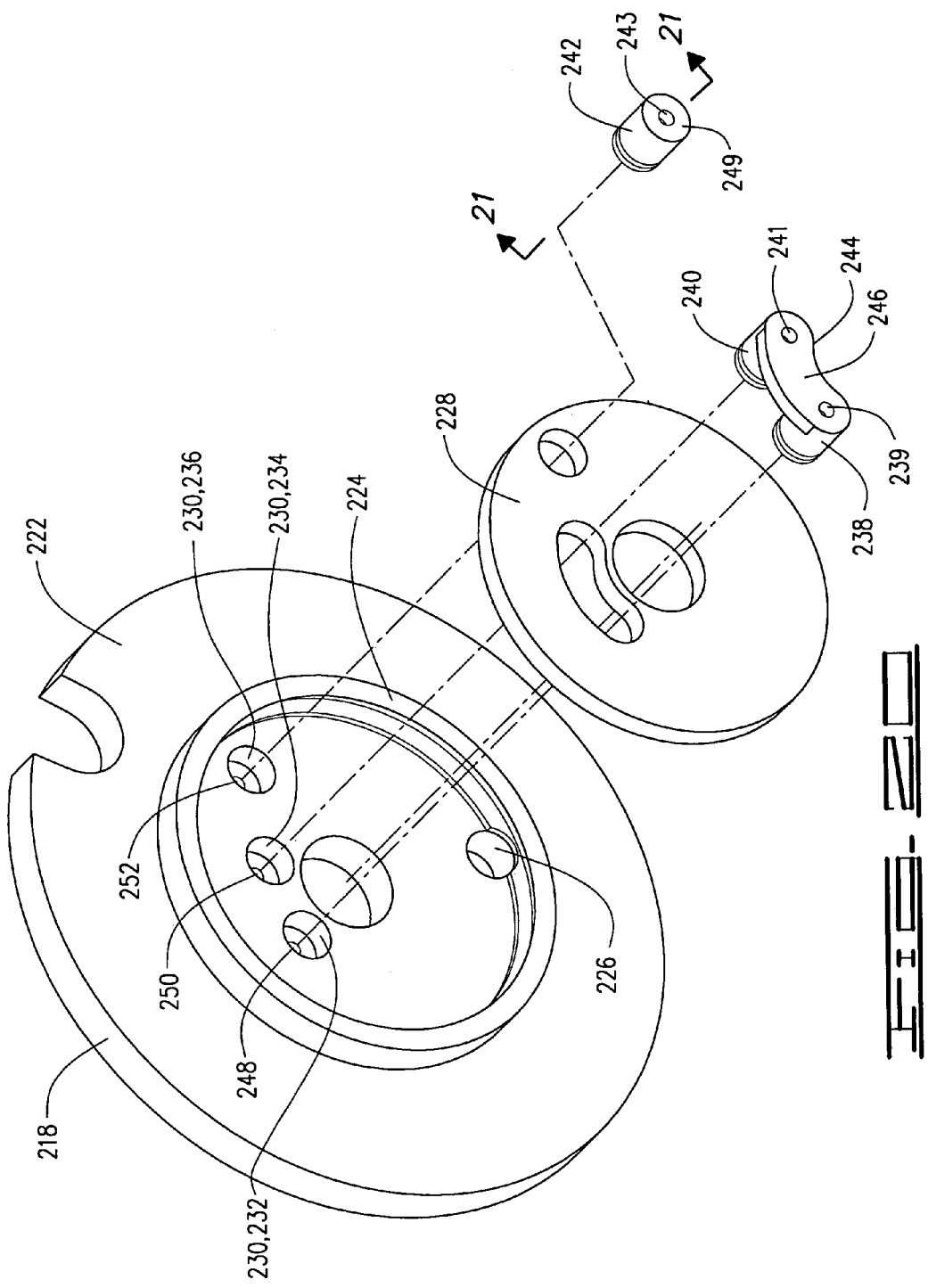
FIG. 20 is a view from line 20-20 of FIG. 15.
Figure 21:
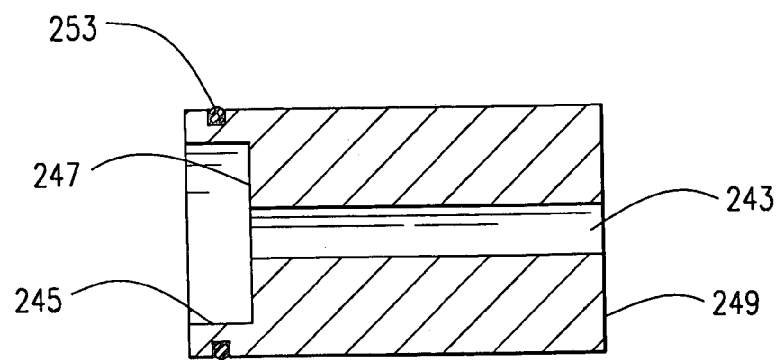
FIG. 21 is a cross-section from line 21-21 of FIG. 20.

Right bearing mount plate 184 is connected to right valve bushing plate 218 with fasteners 182. Right valve bushing plate 218 has a right or outer side 220 and an inner or left side 222. As shown in FIG. 20, which shows inner side 222 of right valve bushing plate 218, a generally circular ring 224 with a generally U-shaped cross-section is affixed thereto by welding or other means known in the art. A felt liner, or absorber 228 is positioned adjacent valve bushing plate 218. An opening 226 is defined through valve bushing plate 218 to allow fluid which may collect in ring 224 to pass therethrough into a disposal hose (not shown). Inner side 222 has three counterbores 230 that may be identified as first, second and third counterbores 232, 234 and 236 to respectively receive a feed bushing 238, a stress bushing 240 and a release bushing 242. Bushings 238, 240 and 242 have feed, stress and release openings 239, 241 and 243, respectively. FIG. 23 shows a cross-section of release bushing 242. Bushing 242 has a recess 245 to defined a shoulder 247 therein. Release bushing 242 has end 249. Feed and recess bushings 238 and 240 are configured similarly and define recesses and shoulders therein.

Feed and stress bushings 238 and 240 are part of a bushing assembly that includes the feed and stress bushings and a connector plate 244 with a smooth engagement surface 246. Right valve bushing plate 218 has a feed air opening 248 for communicating air to and through feed bushing 238, a stress air opening 250 for communicating air to and through stress bushing 240 and a release air opening 252 for communicating air to and through release bushing 242. Each of feed, stress and release bushings 238, 240 and 242 may have O-rings 253 disposed thereabout for sealingly engaging right valve bushing plate 218. Air is communicated to feed, stress and release air openings 248, 250 and 252 through feed, stress, and release openings 186, 188 and 190 in right bearing mount plate 184. The air is communicated through the openings 186, 188 and 190 and into grooves 192, 198 and 206, respectively, and then into openings 248, 250 and 252. Air is then communicated through the feed, stress and reset bushings 238, 240 and 242. Connector plate 244 and feed and stress bushings 238 and 240 along with release bushing 242 are preferably brass bushings.

A right turret mount plate 254 is connected to right valve bushing plate 218. Right turret mount plate 254 has lugs 256 thereon which may be referred to as first, second and third mounting lugs 258, 260 and 262, respectively. Turret support rods 264 are inserted into second and third mounting lugs 260 and 262 and extend between right valve plate assembly 170 and left valve plate assembly 176. The lugs 258, 260 and 262 are utilized to connect turret 50 to frame 32. As shown in FIG. 2, fasteners may be inserted through bushings 265 and threaded into the ends of the two support rods 264.

A right valve plate 266, which may also be referred to as a rotating valve plate 266 is keyed or otherwise fixed to shaft 52 for rotation therewith. Rotating valve plate 266 has a plurality of first or radially inner air openings 268 and a plurality of second or radially outer air openings 270. Openings 268 and 270 are each arranged in generally circular patterns and are arranged such that openings 268 and 270 may be divided into a plurality of pairs of openings 272 and more specifically fourteen pairs of openings 272. A pair 272 consists of an opening 268 and an opening 270 that are aligned such that a line can be drawn from the diametric center of the circular patterns defined by openings 268 and 270 through the centers of the openings which comprise a pair 272. A spacer 274 may be disposed about shaft 50 and positioned between right valve bushing plate 218 and rotating valve plate 266. Rotating valve plate 266 has an outer or right side 276 and an inner or left side 278. When shaft 52 rotates causing rotating valve plate 266 to rotate, each of inner openings 268 will pass first by feed bushing 238, and then by stress bushing 240 so that air from air compressor 44 or other air source is admitted therethrough. Outer openings 270 will pass by and align with release bushing 242 so that air is admitted therethrough.

Figure 16:
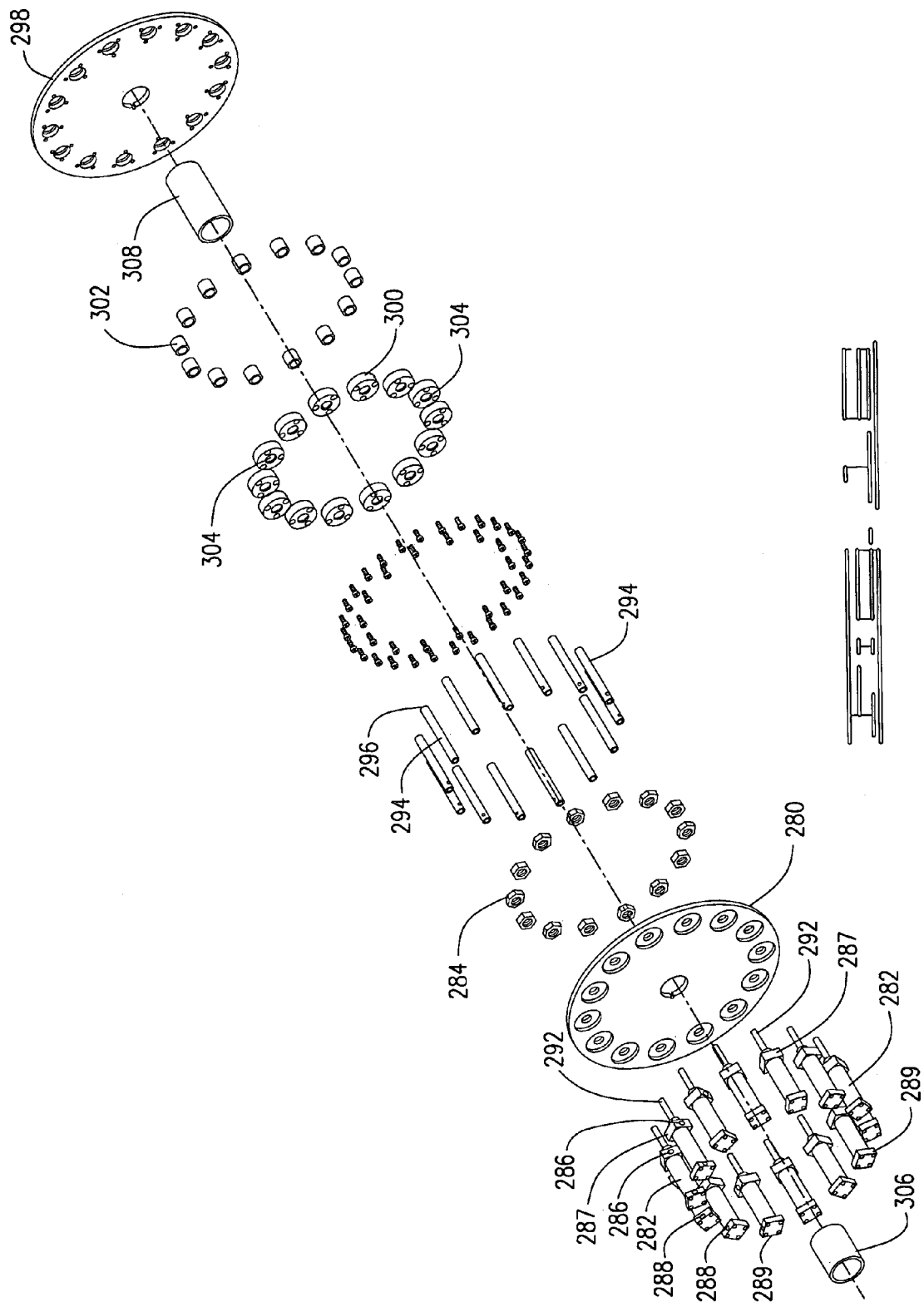
FIG. 16 is an exploded view of the cylinder plate assembly of the current invention.
Figure 17:
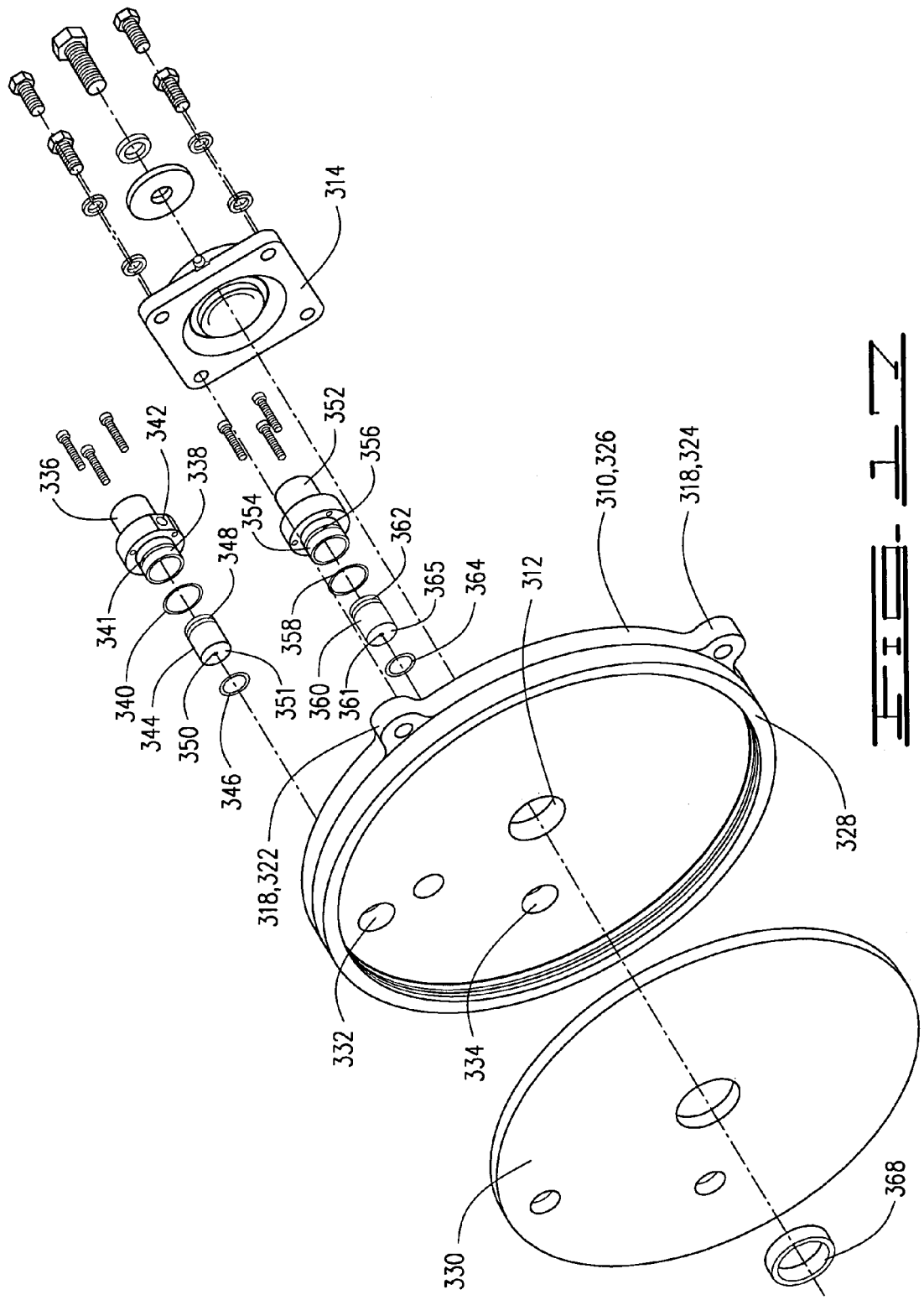
FIG. 17 is an exploded view of the left valve plate assembly of the current invention.

Referring now to FIG. 16, cylinder plate assembly 172 comprises a right cylinder mount plate 280 to which a plurality of air cylinders 282, which may be referred to as nut-clamping cylinders, are mounted with nuts 284 or other means known in the art. Each cylinder has a first or inner air opening 286 at a first or inner end 287 and a second or outer air opening 288 at second, or outer end 289 for admitting air into cylinder 282. As shown in FIG. 7, piston 290 connected to a piston rod 292 is sealingly and slidably disposed in cylinder 282. Piston rods 292 are connected to nut-clamping or nut-holding rods 294. Nut-clamping rods 294 have a central axis 295 and generally conically shaped end 296 for engaging a nut or other pecan. Nut-clamping rods 294 will extend through cylinder rod end plate 298 and through a cylinder rod bushing 302 which may be disposed in cylinder bosses 300 connected to cylinder rod end plate 298. Cylinder rod bushings 302 may be disposed in an opening 304 defined in cylinder bosses 300 and nut-holding or nut-clamping rods 294 may be disposed through bushings 302.

Each air cylinder 282 is operably associated with inner and outer openings 268 and 270 and more specifically each cylinder 282 is operably associated with a pair 272 of inner and outer openings 268 and 270. First opening 286 in each cylinder 282 is communicated with tubing and fittings known in the art to the outer radial opening 270 in a pair 272. Second opening 288 in each cylinder 282 is connected with tubing and other fittings for the communication of air therethrough from the inner radial opening 268 of a pair 272. Thus, as the rotating valve plate 266 rotates, air, identified as feed air, will pass through the inner radial opening 268 of a pair 272 and into second opening 288 in nut-clamping cylinder 282 first to cause piston 290 and nut-clamping rod 294 to move to engage a nut carried by a nut-transporting unit 136 on endless conveyor 100. Additional air, identified as stress air, will be admitted into second opening 288 through the inner opening 268 of the pair 272. The feed air admitted will not be allowed to escape prior to stress air being admitted since as valve plate 266 rotates feed air held in cylinder 282 is prevented from escaping by connecting plate 244 which engages rotating valve plate 266. Continued rotation of valve plate 266 will cause opening 270 in the pair 72 to align with release bushing 242, so that release air will be admitted into the outer radial opening 270 in the pair 72 and into first opening 286 which will cause piston 290 and thus right clamping rod 294 to release, or move away from the nut which was previously clamped to a ready position in which the rod is ready to be moved to engage another nut. Release air is not admitted until the clamped nut has been cracked. This operation will be described in more detail after the remaining details of turret 50 are described. Cylinder mount plate 280 and cylinder rod end plate 298 are keyed to shaft 52, or are otherwise fixed to shaft 52 for rotation therewith. Thus, nut-clamping cylinder 282 and nut-clamping rods 294 rotate with shaft 52. A spacer 306 may be disposed about shaft 252 between cylinder mount plate 280 and rotating valve plate 266. Likewise, a spacer 308 may be disposed about shaft 52 and positioned between cylinder mount plate 280 and cylinder rod end plate 298. Safety catches identified as safety catch 308A, 308B, 308C and 308D may be positioned between cylinder mount plate 280 and cylinder rod end plate 298. Safety catch 308A is welded or otherwise affixed to spacer 308 and safety catch 308B is welded or otherwise affixed to cylinder rod end plate 298. Safety catch 308C is welded or otherwise affixed to plate 280 and safety catch 308D is welded or otherwise affixed to spacer 308.

Left valve plate assembly 176 comprises a left turret mount plate 310 having a central opening 312 therethrough through which shaft 52 is received. A flanged bearing 314 is mounted to left turret mounting plate 312 with fasteners or other means known in the art. Shaft 52 is received in and supported by flanged bearing 314. Left turret mounting plate 310 has mounting lugs 318 which may comprise first, second and third mounting lugs 320, 322 and 324, respectively. Support rods 264 are inserted in lugs 322 and 324 and fasteners will extend through bushings 265 and be threaded into support rods 264 to attach mount plate 310 to frame 32, thus mounting turret 50 to frame 32. Bolts or other fasteners may be inserted through bushings 265 and threaded into threaded inserts received in lugs 258 and 320, or may extend therethrough and be threaded into threaded nuts. Mounting plate 310 may comprise a plate portion 326 and a ring 328 which may have a generally U-shaped cross section and which is welded or otherwise attached to plate portion 326. A felt liner 330 is positioned adjacent plate portion 326.

Left turret mount plate 310 has a first or radially outer opening 332 and a second or radially inner opening 334. First opening 332 may be referred to herein as a crack air opening and opening 334 may be referred to as a reset air opening 334.

An accumulator 336 having an extender 338 is mounted to left turret mount plate 310 with fasteners or other means known in the art. An O-ring 340 is placed in a groove 341 in extender 338. Extender 338 is inserted into opening 332. Accumulator 336 has an air opening 342 through which a fitting, tube or other means to communicate air thereto may be connected. A crack air bushing 344 having an O-ring 346 disposed in a groove 348 therein is inserted into and received in extender 338. Crack air bushing 344 has a central passage 350 through which air is communicated from air opening 342. Crack air bushing 344 has a length such that it extends through felt liner 300 and has an end 351.

An accumulator 352 having extender 354 thereon is inserted into reset air opening 334. Extender 354 may have a groove 356 in which O-ring 358 is received. It is understood that accumulator 352 will have an opening for receiving air from a source such as air compressor 44. A reset bushing 360 is received in extender 354. Reset bushing 360 has an opening or central passage 361 through which air is communicated, and may have a groove 362 in which O-ring 364 is received. Reset bushing 360 has an end 365. When accumulator 352 is mounted to left mount plate 310 extender 354 will extend into opening 334 and bushing 360 will extend through felt liner 330. Bushings 350 and 360 are preferably brass bushings. Opening 350 in bushing 344 is preferably slightly larger than opening 361 in bushing 360. A spacer 368 is received in opening 312, and extends through felt liner 331. Spacer 368 is disposed about shaft 52.

Figure 18:
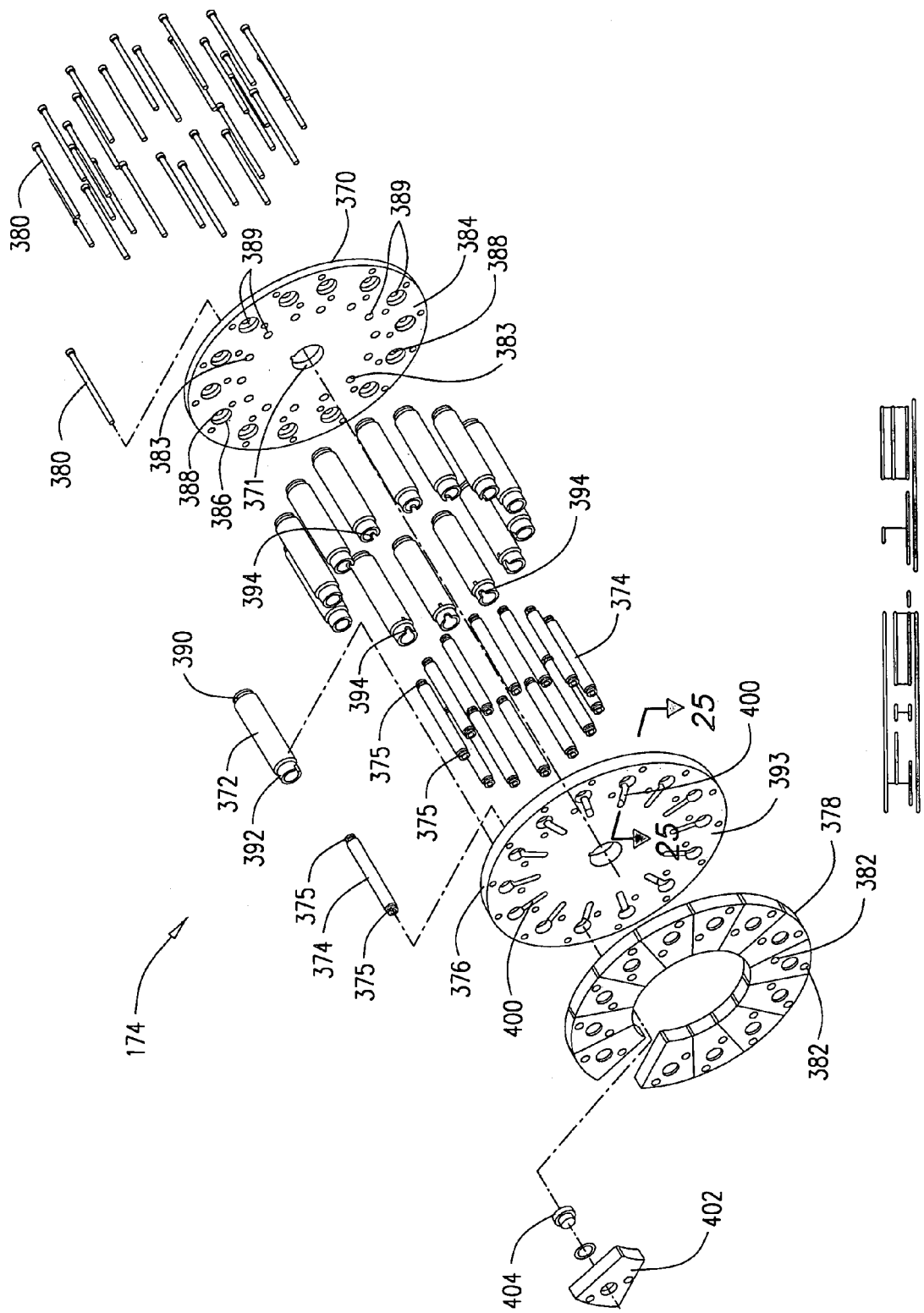
FIG. 18 is an exploded view of the crack die and shuttle assembly of the current invention.
Figure 19:
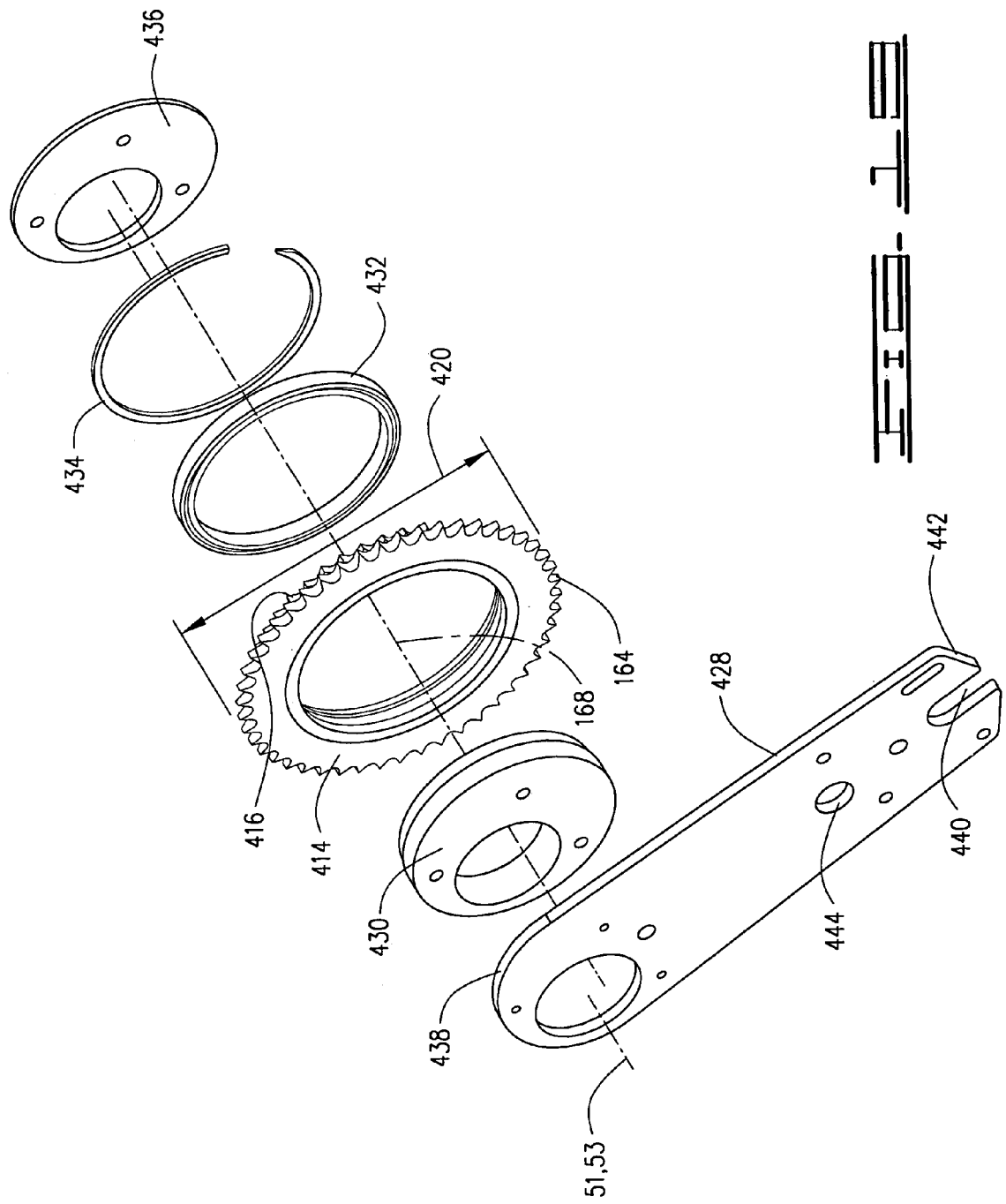
FIG. 19 is an exploded view of the endless conveyor chain drive assembly.

Referring now to FIG. 18, crack die and shuttle assembly 174 comprises a left cylinder mount plate 370 with an opening 371 for receiving shaft 52, a plurality of shuttle cylinders 372, each having a shuttle 373 seen in FIG. 7, sealingly and slidably received therein, a plurality of shuttle return pipes 374 having ends 375, a shuttle end plate 376 and a plurality of crack die assemblies 378. Crack die and shuttle assembly 174 is assembled with a plurality of fasteners 380 that extend through left cylinder plate 370, shuttle end plate 376 and are threaded into openings 382 in crack die assemblies 378. Cylinder mount plate 370 and shuttle end plate 376 are keyed or otherwise fixed to shaft 52 for rotation therewith so that crack die and shuttle assembly 174 rotates with shaft 52.

Left cylinder end plate 370 has a first or inner side 384 and a second or outer side 385. The second, or outer side 385 is positioned adjacent ends 351 and 365 of crack air bushing 344 and reset bushing 360 and is engageable therewith.

Cylinder end plate 370 is rotatable relative to bushings 344 and 360. Cylinder end plate 370 has a plurality of reset air openings 383 arranged in a generally circular pattern. Cylinder end plate 370 has a plurality of counterbores 386 each of which have a crack air opening 388 positioned in the center thereof. Openings 388 preferably are arranged in a circular pattern. Openings 383 and 388 may be divided into pairs 389. A pair 389 comprises a crack air opening 388 and a reset air opening 383 which lie on a line drawn through the centers thereof to a center of opening 371. Each of shuttle cylinders 372 has first and second shoulders, or extensions 390 and 392. Shoulder 390 may have an O-ring disposed thereabout and is received in a counterbore 386. Shoulder 392 has a semi-circular notch 394 therein and may also have an O-ring disposed thereabout. Shuttle end plate 376 has a plurality of crack air openings 396 that are arranged in a generally circular pattern. Shoulder 392 is received in and extends all or substantially all of the way through shuttle end plate 376 to an inner, or right side 393 thereof. Each of openings 396 is communicated with a reset air opening 398. The plurality of reset air openings 398 are preferably arranged in a generally circular pattern and are located radially inwardly of crack air openings 396. Each reset air opening 398 is communicated with an opening 396 with a groove 400 disposed in plate 376. The ends 375 of a shuttle return pipe 374, which may be reduced diameter ends having O-rings disposed in grooves therein, are inserted into openings 398 in shuttle end plate 376 and reset air openings 383 in left cylinder end plate 370.

Each crack die assembly 378 generally includes a wedge or pie-shaped sub 402. A crack die 404 having a central axis 405 and a generally conical inner surface 406 is mounted in wedge 402. The details of crack die 404 are better seen in FIGS. 7 and 12. Central axis 405 of crack die 404 is aligned with central axis 295 of nut-clamping rod 294. Each nut-clamping rod 294 is thus axially aligned with a crack die 404. Crack die 404 has a shoulder 408 defined thereon facing a shoulder 410 defined by wedge 402. An O-ring 412 is disposed between shoulders 408 and 410. When shaft 52 rotates, thereby rotating crack die and shuttle assembly 174, cylindrical end plate 370 will rotate relative to left turret mount plate 310. Openings 388 are arranged so as to align with opening 350 in crack bushing 344 when an opening 388 in a pair 389 rotates thereby to supply air therethrough. Air is supplied therethrough into shuttle cylinder 372 which will force shuttle 373 therein towards and into crack die 404. Shuttle 373 will impact the crack die 404 and will move the crack die slightly toward the nut and will cause the nut held by the nut-cracking unit 49 to be cracked. Continued rotation will bring the opening 383 of the pair 389 into alignment with opening 361 in reset bushing 360 so air is supplied therethrough into shuttle return pipe opening 374. Air passes through opening 398, groove 400, opening 396 and into shuttle cylinder 372 to urge shuttle 373 to its original or reset position where it is ready upon continued rotation of the turret to be moved into crack die 404 to crack another nut. Crack die 404 and nut-clamping rod 294 may comprise nut-cracking unit 49, which may also comprise shuttle cylinder 372, shuttle 373, cylinder 282, piston rod 292 and piston 290.

Nut pocket chain drive assembly 178 comprises a sprocket assembly 414 which includes nut chain sprocket 164 and conveyor, or chain drive sprocket 416. Sprocket 164 is fixedly attached to chain drive sprocket 416 by any means known in the art. Sprocket 164 and chain drive sprocket 416 have common axis of rotation 168. Axis of rotation 168 is offset from center line 53 of shaft 52 which is the turret axis of rotation 51. Sprocket 164 has an outer diameter 420 and chain drive sprocket 416 has an outer diameter 422. Outer diameter 420 is larger than outer diameter 422. Sprockets 164 and 416 are preferably positioned entirely within a circular periphery 424 defined by the nut-clamping rods 294 and the crack dies 404 which, as set forth above, comprise nut-cracking units 49. Thus, axis of rotation 168 and the periphery of sprocket 164 and chain drive sprocket 416 are completely within and are circumscribed by periphery 424, and a periphery 425 defined by turret 50. The diameter of sprockets 164 and 416 is less than a diameter defined by circular periphery 425. Because axis of rotation 168 is offset from axis of rotation 51, sprocket assembly 414 is not concentric with circular periphery 424.

Nut pocket chain drive assembly 178 is mounted to shaft 52. Nut pocket chain drive assembly 178 comprises sprocket assembly 414, bearing support arm 428, and a bearing mount boss 430 that is attached to bearing support arm 428 with fasteners or other means known in the art. Sprocket assembly 414 is disposed about a bearing 432 which may be held in place with a snap ring 434 and a bearing washer 436. Sprocket assembly 414 rotates about bearing 432.

Bearing support arm 428 is mounted to shaft 52 near its upper end 438 thereof and has a notch 440 cut into the lower end 442 thereof. A generally circular opening 446 is disposed between the upper and lower ends 438 and 442 thereof. A turret support rod 264 is disposed through opening 444.

Figure 22:
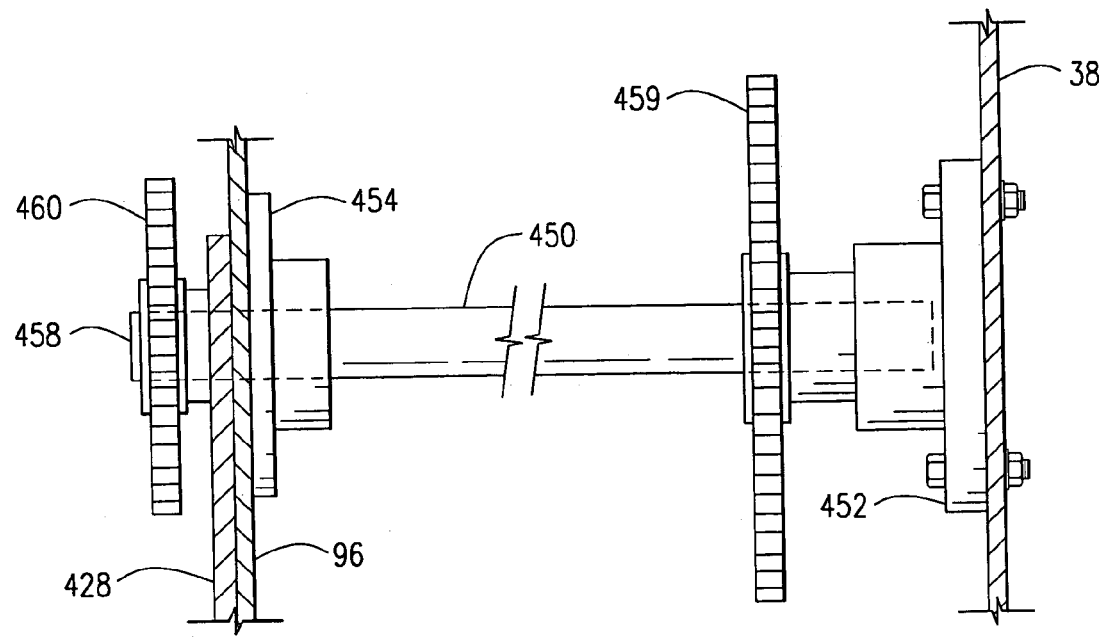
FIG. 22 is a partial section showing the jackshaft arrangement.

Referring now to FIG. 22, a jack shaft 450 is mounted to right side 38 of frame 32 with a flanged bearing 452 and is attached to the right side of divider plate 96 beneath hopper bottom 101 with a flanged bearing 454. Jack shaft 450 has a first end mounted in bearing 452 and extends through divider plate 96 to a second end 458. A jack shaft drive sprocket 459 is mounted to jack shaft 450, and is positioned so that it will be engaged and driven by chain 58. Bearing support arm 428 is attached to divider plate 96 on the side opposite flanged bearing 454 so that divider plate 96 is sandwiched between bearing support arm 428 and flanged bearing 454. Jack shaft 450 is received in groove 440 in bearing support arm 428. A jack shaft sprocket 460 is mounted at or near end 458 of jack shaft 450 for rotation therewith. Sprocket 460 is aligned nut chain drive sprocket 416.

As shown in FIG. 6, chain 58 engages motor sprocket 56, shaft sprocket 60, idler sprockets 64 and 66, and jack shaft drive sprocket 459. When the nut-cracking apparatus 10 is in operation, motor 54 rotates sprocket 56 which moves chain 58 and causes rotation of shaft sprocket 60 and thus shaft 52, and likewise causes rotation of jack shaft drive sprocket 459. Rotation of jack shaft sprocket 459 and jack shaft 450 causes sprocket 460 to rotate. A chain 462 engages sprocket 460 and nut chain drive sprocket 416. Thus, when motor 54 is on, it will rotate jack shaft 450 which will rotate sprocket 460 so that chain 462 will move causing rotation of sprocket assembly 414 thus moving endless conveyor 100 about its rear and forward sprockets 162 and 164. Sprockets 164 and 416 rotate in the same direction as shaft 52 and turret 50.

When endless conveyor 100 is moving, nuts are picked up from hopper 90 in nut pockets 136 and are delivered to a pickup point, or delivery point 466. Pickup point 466 is the point at which a nut is initially engaged by a nut-cracking unit 49. Nuts carried in nut pockets 136 are engaged by a nut-clamping rod 294 which urges the nut against a crack die 404 to hold the nut. Pickup point 466 is the point at which central axes 295 and 405 intersect center line 158 of a nut pocket. Pickup point 466 is positioned approximately 56.7 degrees clockwise from a horizontal line 468 depicted in FIG. 5, which intersects longitudinal central axis 53 of shaft 52.

To time nut-cracking apparatus 10, endless conveyor 100 is positioned so that one of the nut-transporting units 136 is located at the pickup point. Likewise, turret 50 is rotated so that a nut-cracking unit 49 is likewise at the pickup point. Chain 58 is then tightened by moving idler sprockets 64 and 66 in slots 72 and 86. Once chain 58 is tightened, the sprockets are fixed in place and motor 54 may be turned on. The space between adjacent nut pockets 136, and more specifically between centerlines 158 is such that successive or adjacent nut pockets 136 will deliver nuts to pickup point 466 to be engaged by adjacent nut-cracking units 49 as turret 50 rotates. The apparatus of the present invention will preferably crack in excess of 700 nuts per minute and more preferably approximately 750 nuts per minute.

Prior to reaching pickup point 466, nuts in endless conveyor 100 will pass under deflector plate 105. The height of deflector plate 105 relative to nut-transporting units 136 and thus the nuts therein may be adjusted as necessary. Deflector plate 105 will engage those nuts that may be positioned atop a nut that is positioned directly in a nut-transporting unit 136 and thus will insure that only one nut is carried by each nut-transporting unit 136. The orienting plate 124 is generally parallel to upper run 130 and assures that nuts in nut-transporting units 136 are oriented properly. Plate 124 will preferably overlie the pickup point 466 such that when the nut is initially engaged by a nut-cracking unit 49, it is positioned beneath orienting plate 124.

A pneumatic system utilized to supply air may include for example air compressor 44 of a type known in the art and schematically represented in FIG. 1. Compressor 44 may supply air through a lubricator and a filter (not shown) as known in the art and to a manifold (not shown) which will split the air flow off to regulators (not shown) associated with controls for air flow such as, for example, those shown in FIG. 2. Controls may include a feed control 470 having a gauge 472 associated therewith, a stress control 474 having a gauge 476 associated therewith, a crack control 478 having a gauge 480 associated therewith, a release control 482 having a gauge 484 associated therewith and a reset control 486 having a gauge 488 associated therewith. Air hoses, or tubing of a type known in the art may extend from the regulator associated with each control and connected to the accumulators 336 and 352 that are connected to left turret mounting plate 310, and to the three air openings in right bearing mount plate 182 including openings 186 and 188 and to opening 190 through accumulator 214.

Nut-cracking apparatus 10 may therefore include tubing connected to and extending from the regulators (not shown) associated with the feed control 470, stress control 474 and release control 482. The tubing, or hose may extend across frame 32 from the left side 36 to the right side 38 thereof by strapping the tubes to bracket 122 which may be referred to as feed air hose 490, stress air hose 492 and release air hose 494. Feed, stress and release hoses 490, 492 and 494 are schematically shown in FIG. 5. As is known in the art, the hoses will be connected to openings 186 and 188 and to the accumulator 214 with fittings or other means known in the art. Feed air tube 490 will be connected to and communicate through feed air opening 186, stress air tube 492 will communicate air to accumulator 214 and release air hose 494 will communicate air to release air opening 190. Air communicated through opening 186 passes through feed air opening 248 and into feed bushing 238. Air passing through opening 188 passes through feed air opening 250 in right valve bushing plate 218 and into stress air bushing 240. Air passing through release air opening 190 is communicated through release air opening 252 in right valve bushing plate 218 and release air bushing 242.

Each pair 272 of openings in rotating valve plate 266 is operably associated with a cylinder 282. A feed and stress air tube 496 is connected with fittings or other means known in the art to the radially inner opening 268 of a pair 272 and to the second opening 288 in cylinder 282. A release air tube 498 is connected with fittings or other means known in the art to the radially outer opening 270 in the pair 272 and to first opening 286 in the cylinder 282. Thus, as the turret rotates an opening 268 of a pair 272 will align with opening 248, and air will be supplied therethrough and through tube 496 to cause piston 290 and thus nut-clamping rod 294 to move towards crack die 404. The nut-clamping rod will engage a nut delivered by a nut pocket 136 in endless conveyor 100 and urge it towards and into crack die 404 at pickup point 466. The nut will be removed from the nut pocket 136 as the endless conveyor 100 moves and turret 50 rotates. The amount of feed air applied will vary depending on a variety of conditions, including the type and size of nut being cracked, but may for example be 15-25 psi or more preferably 20-25 psi. The application of feed air will urge bushing 238 toward rotating valve plate 266, so that engagement surface 246 contacts rotating valve plate 266. Thus, when feed air is applied, feed air bushing 238, and stress air bushing 240 which is connected thereto with plate 244 may move in counterbores 232 and 234 to span the gap that may exist between right valve bushing plate 218 and rotating valve plate 266. The bushings 238 and 240 will, however, at all times stay in counterbores 232 and 234. Crack die 404 will move slightly so that it is pressed up against the end of shuttle cylinder 372. Continued rotation will cause alignment of the same opening 268 with stress opening 250 so that stress air is applied. A total of 20-25 psi may be applied through stress air opening 250. As described above, the feed air is not released prior to stress air being applied so that the additional air applied through the stress air bushing 240 creates an additional amount of stress on the nut. The additional air applied through the stress air opening 250 increases the pressure in the cylinder by approximately 3-5 psi. The cross-section in FIG. 7 shows one nut-cracking unit 49 after feed air has been applied, but before stress air has been applied.

A crack air tube 500 is connected to accumulator 336 and a reset air tube 502 is connected to accumulator 352. After a nut has been engaged and stressed by a nut-cracking unit, continued rotation will cause opening 350 in crack air bushing 344 to align with a shuttle cylinder 372. Air will be introduced into the cylinder 372 thereof causing shuttle 373 to move to the right to engage the crack die 404. Approximately 15-35 psi may be applied, and preferably 25-35 psi, which is sufficient to move shuttle 373 into crack die 404 with sufficient force to crack the nut held by nut-cracking unit 49. The air will also cause bushing 344 to move into engagement with left cylinder end plate 370. As the turret continues to rotate, the outer opening 270 in a pair 272 will align with release air opening 250, which will urge bushing 242 into rotating valve plate 266. Air supplied through the release air opening 250 and the outer opening 270 will pass through air hose 498 and opening 286 in cylinder 282, to move piston 290, and thus nut-clamping rod 294 to the right to its ready, or release position to release the cracked nut. Approximately 15-25 psi may be required to move piston 290. Continued rotation will then cause the alignment of opening 361 with shuttle return pipe 374 which will cause air to enter opening 398. Air will be communicated from opening 398 to opening 396 through groove 400, which will urge shuttle 373 to the left to a cracking or reset position. Approximately 5-10 psi may be applied to move shuttle 373. The amount of air to be applied for the feed, stress, crack, release and reset operations set forth herein are exemplary and as set forth above may vary depending upon the size, shape and type of nut or pecan being cracked.

Referring to FIG. 5, after feed air is supplied to a nut-cracking unit 49 at pickup point 466, stress air is applied at approximately 119.5° clockwise from horizontal line 468 and crack air is applied to the crack shuttle cylinder 372 at approximately 136°. Release air is applied at approximately 161.7° clockwise and reset air is applied at approximately 206° clockwise from line 168. Although the numbers set forth herein are those utilized in the preferred embodiment, other configurations are possible.

Bumper 121 and safety catches 308A-308D are safety features. If, for any reason, release air fails to move a nut-clamping rod 294 to its ready, or initial position, bumper 121 will be engaged which will stop rotation of turret 50. Catches 308A-308D will prevent right cylinder mount plate 280 and cylinder rod end plate 298 from rotating relative to one another.

After the nut has been cracked, the nut and shell fragments, or shrapnel are directed into an outlet 504 and then into a single receptacle. A catch plate 506 may be attached to frame 32 to direct nuts and fragments into outlet 504. The shrapnel or shell fragments from a cracked nut are substantially contained in a crack containment area 510 which prevents excessive spray of shell fragments. Crack containment area 510 comprises a pair of ribs 512 connected to door 34 which define a space 514 therebetween. Each of ribs 512 extends from a rear edge 516 that is positioned over turret 50 preferably at a location forward of delivery point 466. Ribs 512 extend from rear edge 516 to forward edge 518 which is near forward lower edge 35 of lid 34. Ribs 512 may be comprised from a plastic, for example, an ultra-high molecular-weight (UHMW) plastic. Ribs 512 define an arcuate, or curvilinear edge 520 that is shaped to be concentric with circular periphery 425 of turret 50 and circular periphery 424. When lid 34 is closed, a small clearance is provided between ribs 512 and turret 50 at both of rib 512 locations. Crack containment area 510 may also comprise a portion of arcuate edge 120 of divider plate 96. A rib 524 may be connected to the inside of the forward end of frame 32 below lid 34 and may have an arcuate periphery shaped similarly to the circular periphery defined by turret 50. Thus, ribs 512, 524 and divider plate 96 may define the sides of crack containment area 510. The crack location of the nut is within confinement area 510 so that when a nut is cracked, the shrapnel, or at least a substantial portion thereof is maintained in crack confinement area 510 by the sides thereof. When release air is applied so that the nut-clamping rod 294 is moved away from the cracked nut, the shrapnel and the cracked nut will stay in confinement area 510 and will be directed through outlet 504 by outlet plate 506, which is positioned to catch shrapnel and the nut and direct it through outlet 504 into the desired receptacle. Containment area 510 thus contains not only the cracked nut but all, or substantially all of the shell fragments so that the cracked nut and substantially all of the shell fragments may be directed through a single outlet into a container or other receptacle.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A nut-cracking apparatus for cracking nuts comprising:
   an endless conveyor for delivering nuts to a pickup point, wherein the endless conveyor rotates about a rear conveyor sprocket and a forward conveyor sprocket; and
   a turret rotatably mounted to a frame, the turret comprising a plurality of nut-cracking units, wherein each nut-cracking unit will move past the pickup point as the turret rotates to engage a nut positioned on and carried by the endless conveyor, and wherein the center of rotation of the forward sprocket lies within a periphery defined by the nut-cracking units and is offset from a center of rotation of the turret and the direction of rotation of the forward and rear sprockets is the same as the direction of rotation of the turret.

2. The nut-cracking apparatus of claim 1, wherein the forward conveyor sprocket lies completely within the outer periphery defined by the nut-cracking units.

3. The nut-cracking apparatus of claim 1, further comprising an orienting plate positioned over at least a portion of the endless conveyor, the orienting plate having a first end and a second end, the pickup point being located between the first and second ends of the orienting plate.

4. The nut-cracking apparatus of claim 1 further comprising a nut containment area for containing shell fragments and for directing substantially all of the shell fragments along with nuts cracked by the apparatus into a single outlet.

5. The nut-cracking apparatus of claim 4, further comprising:
   a door pivotably attached to the frame, the door movable from an open position to a closed position to cover the turret, wherein the nut containment area comprises first and second ribs attached to the door, wherein each rib has an arcuately shaped edge.

6. The nut-cracking apparatus of claim 5, wherein the arcuate edges of the first and second ribs are generally concentric with the circular periphery defined by the turret.

7. The nut-cracking apparatus of claim 1, the apparatus having a release point at which the nut-cracking unit disengages and releases a cracked nut, wherein the turret rotates through less than 180° from the pickup point to the release point.

8. The nut-cracking apparatus of claim 7, wherein the turret rotates through less than 110° between the pickup point and the release point.

9. A nut-cracking apparatus comprising:
   an endless conveyor comprising a plurality of nut-transporting units for carrying nuts to a delivery point, the nut-transporting units being mounted to a feed chain, wherein the feed chain engages first and second sprockets;
   a rotatable turret mounted to a frame, the rotatable turret comprising a plurality of nut-cracking units, wherein each nut-cracking unit is adapted to engage a nut carried in one of the nut-transporting units and to remove the nut therefrom at the delivery point, wherein the delivery point is located above an axis about which the rotatable turret rotates;
   a shell containment area for restricting the dispersion of shell fragments during a nut-cracking operation and for directing substantially all shell fragments into a single outlet through which cracked nuts are directed, wherein the shell containment area comprises opposed ribs positioned radially outwardly from the turret, the ribs having an arcuate contour; and
a door pivotably mounted to the frame, wherein the opposed ribs are attached to the door.

10. The nut-cracking apparatus of claim 9, wherein the nut-cracking unit carries the nut removed from the nut pocket to a release point, wherein the angular distance between the delivery point and the release point is less than 180°.

11. The nut-cracking apparatus of claim 9, wherein the turret comprises:
a crack die and shuttle assembly; and
a cylinder assembly, wherein the endless conveyor travels between the crack die and shuttle assembly and the cylinder assembly.

12. The apparatus of claim 9, further comprising an orienting plate positioned over the nut-transporting units for at least a portion of an upper run of the endless conveyor, the orienting plate covering the delivery point.

13. The apparatus of claim 9, each nut-cracking unit comprising:
a crack die mounted in the turret; and
a nut-clamping rod mounted in the turret, the nut-clamping rod being connected to a piston disposed in a nut-clamping cylinder having a first end and a second end, the nut-clamping cylinder defining:
a first opening for admitting air into the first end of the nut-clamping cylinder; and
a second opening for admitting air into the second end of the nut-clamping cylinder, the turret comprising a rotating valve plate positioned at the second end of the cylinders and spaced therefrom, the rotating valve plate having a plurality of openings through which air is communicated to the first and second openings in the nut-cracking cylinder, and wherein feed air admitted into the second opening in the nut-clamping cylinder causes the nut-clamping rod to move toward the crack die to engage the nut carried by one of the nut-transporting units.

14. The nut-cracking apparatus of claim 13, wherein the plurality of openings in the rotating valve plate comprise a plurality of pairs of openings, each pair of openings being associated with one of the nut-clamping cylinders, and wherein feed air is first admitted through one of the openings in a pair to the second opening in the nut-clamping cylinder to urge the nut-clamping rod into engagement with the nut and to hold the nut between the nut-clamping rod and the crack die, and wherein as the turret rotates additional air is admitted through the same one of the openings in the pair to apply stress to the nut engaged by the nut-clamping rod.

15. The nut-cracking apparatus of claim 14, further comprising means for preventing feed air from escaping from the nut-clamping cylinder prior to the time the additional air is admitted.

16. The nut-cracking apparatus of claim 15, the means for preventing comprising a bushing assembly located adjacent the rotating valve plate, the bushing assembly comprising a feed bushing and a stress bushing connected by a connector plate, the feed and stress bushings comprising spaced feed air and stress air openings, wherein the feed air opening in the bushing assembly admits feed air to the openings in the rotating valve plate and the stress air opening in the bushing assembly admits stress air into the openings in the rotating valve plate as the rotating valve plate rotates relative to the connector being in engagement with the rotating valve plate to prevent feed air from escaping prior to the time stress air is admitted to the nut-clamping cylinder.

17. A nut-cracking apparatus comprising:
a turret rotatably mounted to a frame, the turret comprising a plurality of circumferentially spaced nut-cracking units;
an endless conveyor mounted to the frame for delivering nuts from a hopper to a pickup point, the endless conveyor comprising a plurality of nut pockets mounted to a chain; and
a motor for rotating the turret and for moving the endless conveyor so that the nut-cracking units and nut pockets will align at the pickup point, and wherein each nut-cracking unit will engage a nut carried in a nut pocket at the pickup point and remove the nut from the nut pocket, each nut-cracking unit comprising:
a crack die; and
a nut-clamping rod axially opposed from the crack die, the nut-clamping rod being connected to a piston rod disposed in a nut-clamping cylinder and axially movable therein, the nut-clamping cylinder having first and second air openings to admit air into the nut-clamping cylinder, wherein air admitted into the second air opening causes the piston to move toward the crack die so that the nut-clamping rod will engage the nut and hold the nut against the crack die, the turret comprising:
a rotating valve plate operably associated with the nut-clamping cylinders, the rotating valve plate defining a plurality of openings for admitting air into the first and second air openings in the nut-clamping cylinder; and
a stationary valve plate, wherein the stationary valve plate defines three passages for admitting air into the openings in the rotating valve plate, the passages comprising a feed passage, a stress passage and a release passage, wherein feed air is admitted through the feed passage and the rotating valve plate into the second air opening in the cylinder to move the nut-clamping rod into engagement with the nut and to urge the nut into engagement with the crack die, and wherein an additional amount of air is admitted through the stress passage and the rotating valve plate into the second air opening and nut-clamping cylinder to apply additional pressure to the nut, prior to the feed air from the nut-clamping cylinder being released.

18. The nut-cracking apparatus of claim 17 wherein the stationary valve plate has an inner side and an outer side, the stationary valve plate having a release bushing positioned in a counterbore in the inner side thereof through which release air is communicated to the rotating valve plate, the apparatus further comprising feed and stress valve bushings connected by a connector plate, each being received in a counterbore defined in the inner side of the stationary valve plate, wherein the connector plate is positioned adjacent the rotating valve plate and prevents feed air from escaping from the nut-clamping cylinder prior to the time stress air is admitted.

19. The nut-cracking apparatus of claim 17, further comprising first and second conveyor sprockets about which the endless conveyor moves, the nut-cracking units defining a generally circular periphery, wherein the axis of rotation of the second conveyor sprocket lies within the circular periphery defined by the nut-cracking units.

20. The nut-cracking apparatus of claim 17, each nut-cracking unit further comprising:

a crack die cylinder having a crack die mounted in a first end thereof; and a shuttle slidably disposed in the crack die cylinder, wherein air is admitted into one end of the crack die cylinder after stress air has been applied to the nut-clamping cylinder and before release air has been admitted to the nut-clamping cylinder, wherein the shuttle will impact the crack die to crack the nut being held by the nut-cracking unit.

21. The nut-cracking apparatus of claim 20, wherein air is admitted into crack die cylinder at or near the first end thereof to move the shuttle to a reset position after the nut held by the nut-cracking unit has been cracked.

22. The nut-cracking apparatus of claim 17 further comprising an orienting plate positioned over at least a portion of the endless conveyor, wherein the orienting plate overlies the pickup point.

23. The nut-cracking apparatus of claim 17, further comprising a door pivotably connected to the frame and movable between an open and a closed position, the nut-cracking apparatus defining a shell containment area when the door is in the closed position, wherein the shell containment area restricts the spray of shell fragments during cracking and directs substantially all shell fragments along with the cracked nuts into a single outlet.

24. A nut-cracking apparatus comprising:
an endless conveyor mounted on a rear conveyor sprocket and a forward conveyor sprocket, the endless conveyor comprising a plurality of nut pockets mounted to an endless chain for transporting nuts to a pickup point;
a turret rotatably mounted on a frame, the turret comprising a plurality of circumferentially spaced nut-cracking units, each nut-cracking unit comprising:
a crack die mounted at the end of a crack die cylinder, the crack die cylinder having a shuttle slidably disposed therein; and
a nut-clamping rod connected to a piston located in a nut-clamping cylinder, the nut-clamping rod movable between a clamping position and an open position, wherein air admitted to a second end of the clamping cylinder causes the clamping rod to move to the clamping position to engage a nut at the pickup point, and wherein the shuttle impacts the crack die after the nut is clamped to crack the nut, the pickup point being located above an axis of rotation of the turret, an axis of rotation of the forward conveyor sprocket being offset from the axis of rotation of the turret; and
a door pivotably attached to the frame and movable between open and closed positions, the apparatus having a shell containment chamber for limiting the spray of shell fragments when a nut is cracked.

25. The nut-cracking apparatus of claim 24, wherein the shell containment chamber is comprised of a pair of spaced-apart ribs attached to the door.

26. The nut-cracking apparatus of claim 25, wherein the ribs are comprised of plastic.

27. The nut-cracking apparatus of claim 24, the containment chamber comprising a pair of opposed ribs positioned to deflect substantially all shell fragments into a single outlet to which cracked nuts are also directed.

28. Apparatus for cracking nuts comprising:
a bin for holding the nuts to be cracked, the bin having a divider plate positioned therein to divide the bin into first and second portions;
an endless conveyor movably disposed about a plurality of sprockets, the endless conveyor comprising a chain and a plurality of nut-transporting units, the endless conveyor having an upper run extending from the bin to a pickup point at which a nut carried by a nut-transporting unit is removed therefrom; and
a deflector plate mounted to the divider plate and positioned over a portion of the upper run of the conveyor to deflect nuts from nut-transporting units so that each nut-transporting unit carries a single nut, the nut-transporting units having a first side and a second side, the first side being adjacent to the divider plate, wherein the deflector plate extends at an angle from the divider plate toward the second side of the nut-transporting units to deflect nuts therefrom.

29. The apparatus of claim 28, wherein the deflector plate angles away from the divider plate at an angle between 0° and 90°.

30. The apparatus of claim 28, the endless conveyor being disposed about a forward conveyor sprocket and a rear conveyor sprocket, wherein the endless conveyor is inclined upwardly from the rear sprocket to the pickup point, and wherein the height of the deflector plate relative to the endless conveyor is adjustable.

31. The apparatus of claim 28 further comprising an orienting plate positioned above and generally parallel to the endless conveyor, the orienting plate being positioned forward of the deflector plate, wherein the orienting plate orients the nuts carried by the nut-transporting units for engagement by a nut-cracking unit which removes the nut from the nut-transporting unit.

32. The apparatus of claim 31, wherein the orienting plate overlies the pickup point.

33. The apparatus of claim 28, further comprising a turret rotatably mounted to a frame, the turret comprising a plurality of nut-cracking units, wherein nuts are removed from successive nut-transporting units by adjacent nut-cracking units as the conveyor moves and the turret rotates.

34. A nut-cracking apparatus comprising:
an endless conveyor comprising a plurality of nut-transporting units for carrying nuts to a delivery point, the nut-transporting units being mounted to a feed chain, wherein the feed chain engages first and second sprockets; and
a rotatable turret mounted to a frame, the rotatable turret comprising a plurality of nut-cracking units, wherein each nut-cracking unit is adapted to engage a nut carried in one of the nut-transporting units and to remove the nut therefrom at the delivery point, wherein the delivery point is located above an axis about which the rotatable turret rotates, each nut-cracking unit comprising:
a crack die mounted in the turret; and
a nut-clamping rod mounted in the turret, the nut-clamping rod being connected to a piston disposed in a nut-clamping cylinder having a first end and a second end, the nut-clamping cylinder defining:
a first opening for admitting air into the first end of the nut-clamping cylinder; and
a second opening for admitting air into the second end of the nut-clamping cylinder, the turret comprising a rotating valve plate positioned at the second end of the cylinders and spaced therefrom, the rotating valve plate having a plurality of openings through which air is communicated to the first and second openings in the nut-cracking cylinder, and wherein feed air admitted into the second opening in the nut-cracking cylinder causes the nut-clamping rod to move toward the crack die to engage the nut carried by one of the nut-transporting units;

wherein:

the plurality of openings in the rotating valve plate comprise a plurality of pairs of openings, each pair of openings being associated with one of the nut-clamping cylinders, and wherein feed air is first admitted through one of the openings in a pair to the second opening in the nut-clamping cylinder to urge the nut-clamping rod into engagement with the nut and to hold the nut between the nut-clamping rod and the crack die, and wherein as the turret rotates additional air is admitted through the same one of the openings in the pair to apply stress to the nut engaged by the nut-clamping rod; and means for preventing feed air from escaping from the nut-clamping cylinder prior to the time the additional air is admitted.

35. The nut-cracking apparatus of claim 34, the means for preventing comprising a bushing assembly located adjacent the rotating valve plate, the bushing assembly comprising a feed bushing and a stress bushing connected by a connector plate, the feed and stress bushings comprising spaced feed air and stress air openings, wherein the feed air opening in the bushing assembly admits feed air to the openings in the rotating valve plate and the stress air opening in the bushing assembly admits stress air into the openings in the rotating valve plate as the rotating valve plate rotates relative to the connector being in engagement with the rotating valve plate to prevent feed air from escaping prior to the time stress air is admitted to the nut-clamping cylinder.

* * * * *